United States Patent
Wang et al.

(10) Patent No.: US 10,914,486 B2
(45) Date of Patent: Feb. 9, 2021

(54) AIR CONDITIONER SYSTEM AND A CONTROL METHOD FOR THE SAME

(71) Applicants: GD MIDEA HEATING & VENTILATING EQUIPMENT CO., LTD., Foshan (CN); MIDEA GROUP CO., LTD., Foshan (CN)

(72) Inventors: Xinli Wang, Foshan (CN); Yongfeng Xu, Foshan (CN); Meibing Xiong, Foshan (CN); Mingkun Feng, Foshan (CN); Gen Li, Foshan (CN); Haowei Zhao, Foshan (CN)

( * ) Notice: Subject to any disclaimer, the term of this patent is extended or adjusted under 35 U.S.C. 154(b) by 190 days.

(21) Appl. No.: 16/282,321

(22) Filed: Feb. 22, 2019

(65) Prior Publication Data

US 2019/0186776 A1  Jun. 20, 2019

Related U.S. Application Data

(63) Continuation of application No. PCT/CN2017/080830, filed on Apr. 17, 2017.

(30) Foreign Application Priority Data

Aug. 29, 2016  (CN) .......................... 2016 1 0750556

(51) Int. Cl.
*F24F 11/74* (2018.01)
*F24F 11/84* (2018.01)
(Continued)

(52) U.S. Cl.
CPC .............. *F24F 11/74* (2018.01); *F24F 11/84* (2018.01); *F24F 11/86* (2018.01); *F24F 13/20* (2013.01);
(Continued)

(58) Field of Classification Search
CPC .. F24F 11/74; F24F 11/84; F24F 11/86; F24F 13/20; F25B 13/00; F25B 41/04;
(Continued)

(56) References Cited

U.S. PATENT DOCUMENTS

| | | | | |
|---|---|---|---|---|
| 2006/0048526 A1* | 3/2006 | Lifson | .................... | F25B 41/04 62/160 |
| 2010/0319376 A1* | 12/2010 | Kawano | .................. | F25B 13/00 62/238.6 |

(Continued)

FOREIGN PATENT DOCUMENTS

| CN | 103292523 A | 9/2013 |
|---|---|---|
| CN | 103307866 A | 9/2013 |

(Continued)

OTHER PUBLICATIONS

International Search Report dated Jul. 12, 2017 in the corresponding PCT application (application No. PCT/CN2017/080830).

(Continued)

*Primary Examiner* — Marc E Norman
(74) *Attorney, Agent, or Firm* — Kilpatrick Townsend & Stockton, LLP

(57) ABSTRACT

The present disclosure provides an air conditioner system and a control method for the same. The air conditioner system includes: a refrigeration system. A first port of a second four-way valve is connected to a pipeline between the first four-way valve and the indoor heat exchanger, and a second port of a second four-way valve is connected to a first position in a pipeline between the indoor heat exchanger and the outdoor heat exchanger. A first port of the first passage of an auxiliary heat exchanger is in communication with a fourth port of the second four-way valve, and a
(Continued)

second port of the first passage is connected to a second position in a pipeline between the indoor heat exchanger and the outdoor heat exchanger.

18 Claims, 8 Drawing Sheets

(51) Int. Cl.
| | | |
|---|---|---|
| F24F 11/86 | (2018.01) | |
| F24F 13/20 | (2006.01) | |
| F24B 13/00 | (2006.01) | |
| F25B 41/04 | (2006.01) | |
| F25B 49/02 | (2006.01) | |
| F25B 13/00 | (2006.01) | |

(52) U.S. Cl.
CPC .............. *F25B 13/00* (2013.01); *F25B 41/04* (2013.01); *F25B 49/02* (2013.01); *F25B 2313/02742* (2013.01); *F25B 2313/02743* (2013.01); *F25B 2500/31* (2013.01); *F25B 2600/2509* (2013.01); *F25B 2700/1931* (2013.01); *F25B 2700/2106* (2013.01); *F25B 2700/21152* (2013.01)

(58) Field of Classification Search
CPC ............ F25B 49/02; F25B 2313/02742; F25B 2313/02743; F25B 2500/31; F25B 2600/2509; F25B 2700/1931; F25B 2700/2106; F25B 2700/21152
See application file for complete search history.

(56) References Cited

U.S. PATENT DOCUMENTS

| | | | |
|---|---|---|---|
| 2015/0033780 A1 | 2/2015 | Hatomura et al. | |
| 2015/0068241 A1* | 3/2015 | Sun ......................... | F25B 13/00 62/324.6 |
| 2015/0292757 A1* | 10/2015 | Motomura .............. | F25B 13/00 62/324.1 |
| 2019/0331375 A1* | 10/2019 | Tanaka ................... | F25B 49/02 |

FOREIGN PATENT DOCUMENTS

| | | |
|---|---|---|
| CN | 203837343 U | 9/2014 |
| CN | 104613665 A | 5/2015 |
| CN | 105716311 A | 6/2016 |
| CN | 106288488 A | 1/2017 |
| EP | 2000751 A2 | 12/2008 |
| EP | 2918951 A1 | 9/2015 |
| JP | H0989416 A | 4/1997 |
| JP | 2009293899 A | 12/2009 |

OTHER PUBLICATIONS

European Search Report dated Jul. 9, 2019 in the corresponding European Application No. 17844887.4.

* cited by examiner

AIR CONDITIONER SYSTEM AND A CONTROL METHOD FOR THE SAME

RELATED APPLICATIONS

This application is a continuation of International Application No. PCT/CN2017/080830, filed on Apr. 17, 2017, which claims priority to Chinese Patent Application No. 201610750556.1, filed with the Chinese Patent Office on Aug. 29, 2016, and entitled "AN AIR CONDITIONER SYSTEM AND A CONTROL METHOD FOR THE SAME", which is incorporated herein by reference in their entirety.

FIELD

The present disclosure relates to the field of air conditioners, and in particular, to an air conditioner system and a control method for the same.

BACKGROUND

With the improvement of people's living standards and the enhanced awareness of energy conservation, air conditioners have become gradually widespread. When an air conditioner is heating in a low temperature environment, the temperature of the outdoor heat exchanger is relatively low, and it is easy to frost, which in turn greatly reduces the heat absorbed by the refrigerant from the air. This results in poor heating effect of the air conditioner and affects the usage effect for the user.

In the meantime, due to the long piping, large drop, and complicated system of a multi-split air conditioning system, its compressor must be in an effective lubrication state at all times to ensure reliable operation of the system. If the compressor is in the state of small-load operation for a long period of time, the lubricating oil of the system may not be returned to the compressor in time, which may cause damage to the compressor due to poor lubrication, thereby affecting the reliability of the entire compressor unit.

SUMMARY

One embodiment of the present disclosure is to propose a novel air conditioner system, which can effectively avoid the damage to the compressor due to oil shortage caused by small-load operation of the air conditioner system for a long period of time, and can also enhance the low-temperature heating capability of the air conditioner system.

Another embodiment of the present disclosure is to correspondingly provide a control method and a control device for an air conditioner system.

According to an embodiment of the present disclosure, an air conditioner system includes: a refrigeration system including at least a compressor, a first four-way valve, an outdoor heat exchanger, and an indoor heat exchanger; a second four-way valve, a first port of which is connected to a pipeline between the first four-way valve and the indoor heat exchanger, and a second port of which is connected to a first position in a pipeline between the indoor heat exchanger and the outdoor heat exchanger; an auxiliary heat exchanger having a first passage and a second passage, and a first port of the first passage is in communication with a fourth port of the second four-way valve, a second port of the first passage is connected to a second position in a pipeline between the indoor heat exchanger and the outdoor heat exchanger, a first port of the second passage is connected to a third position in the pipeline between the indoor heat exchanger and the outdoor heat exchanger, and a second port of the second passage is connected to any position in a pipeline between the outdoor heat exchanger and a return-air inlet of the compressor; a first throttle component disposed in a pipeline between the second port of the first passage and the second position, or in a pipeline disposed between the first port of the first passage and the fourth port of the second four-way valve; and a second throttle component disposed on a pipeline between the first port of the second passage and the third position.

In the air conditioner system according to the embodiment of the present disclosure, the second four-way valve and the auxiliary heat exchanger are provided, and the first throttle component and the second throttle component are provided such that when the first throttle component is disposed in the pipeline between the second port of the first passage and the second position, if the air conditioner system is heating in a small-load operation state, the first throttle component and the second throttle component can be controlled to open, and the first port and the fourth port of the four-way valve are controlled to be communicated. In this way, the refrigerant after passing through the first four-way valve is divided into two branches, the refrigerant of one branch enters the second passage of the auxiliary heat exchange after passing through the indoor heat exchanger and being throttled by the second throttle component, the refrigerant of another branch can directly enter the first passage of the auxiliary heat exchanger through the second four-way valve, and then the two branches of refrigerants exchange heat. That is, the refrigerant in the second passage evaporates in the auxiliary heat exchanger due to being throttled by the second throttle component, and the refrigerant in the first passage is condensed. This can improve the evaporation pressure and the evaporation temperature of the air conditioner system, and avoid the damage to the compressor due to oil shortage caused when the air conditioner system is in the small-load heating operation. Also, the overall heat exchange capacity of the air conditioner unit can be also improved, and the low temperature heating capacity of the air conditioner system can be enhanced.

When the first throttle component is disposed on the pipeline between the first port of the first passage and the fourth port of the second four-way valve, if the air conditioner system is cooling under the small-load operation state, the first throttle component and the second throttle component can be controlled to open, and the second port and the fourth port of the second four-way valve can be controlled to be communicated, such that the refrigerant after passing through the outdoor heat exchanger is divided into two branches, the refrigerant of one branch enters the second passage of the auxiliary heat exchanger after passing through the outdoor heat exchanger and being throttled by the second throttling component, the refrigerant of another branch can directly enter the first passage of the auxiliary heat exchanger and enter the indoor heat exchanger through the second four-way valve to evaporate and exchange heat, and the refrigerants of the two branches in the auxiliary heat exchanger exchange heat. That is, the refrigerant in the second passage is throttled by the second throttle component, and thus evaporates in the auxiliary heat exchanger, and the refrigerant in the first passage is condensed, thereby increasing the evaporation pressure and the evaporation temperature of the air conditioner system, and avoiding the damage to the compressor due to oil shortage caused by the air conditioner system being in the small-load cooling operation.

In addition, when the first throttle component is disposed on the pipeline between the second port of the first passage and the second position, and the air conditioner system is heating in a low temperature environment, the first throttle component and the second throttle component can be controlled to open, and the second port and the fourth port of the second four-way valve can be controlled to be communicated, so that the refrigerant after passing through the indoor heat exchanger is divided into two branches, the refrigerant of one branch enters into the second passage of the auxiliary heat exchanger after passing through the indoor heat exchanger and the second throttle component, the refrigerant of another branch can directly enter the first passage of the auxiliary heat exchanger through the second four-way valve, and the refrigerants of the two branches exchange heat. That is, the refrigerant in the second passage is throttled by the second throttle component, and thus evaporates in the auxiliary heat exchanger, and the refrigerant in the first passage is condensed, thereby increasing the evaporation pressure and the evaporation temperature of the air conditioner system, and effectively utilizing the heat of the condensed refrigerant. This improves the overall heat exchange amount of the air conditioner system and enhances the low temperature heating capacity of the air conditioner system.

The air conditioner system according to the above embodiment of the present disclosure may further have the following additional features.

According to an embodiment of the present disclosure, the refrigeration system further includes a third throttle component and a gas-liquid separator; and four ports of the first four-way valve are respectively communicated with an exhaust outlet of the compressor, a first port of the outdoor heat exchanger, a first port of the indoor heat exchanger, and an inlet of the gas-liquid separator, a second port of the outdoor heat exchanger is in communication with a second port of the indoor heat exchanger through the third throttle component, and an outlet of the gas-liquid separator is in communication with the return-air inlet of the compressor;

a second port of the second passage is connected to a pipe in which the first port of the outdoor heat exchanger is in communication with the first four-way valve, a pipe in which the inlet of the gas-liquid separator is in communication with the first four-way valve or a pipe in which the outlet of the gas-liquid separator is in communication with the return-air inlet of the compressor.

According to an embodiment of the present disclosure, the air conditioner system further includes: a controller connected to the first throttle component, the second throttle component, and the second four-way valve and configured to control the first throttle component, the second throttle component, and the second four-way valve.

According to an embodiment of the present disclosure, the controller is configured to: control the first throttle component and the second throttle component to open, and control the second port and the fourth port of the second four-way valve to be communicated, if the air conditioner system is heating, and it is detected that the outdoor ambient temperature is to be lower than or equal to a first set temperature value, the exhaust superheat degree of the compressor is less than or equal to a first set superheat degree for a first predetermined duration, when the first throttle component is disposed in the pipeline between the second port of the first passage and the second position.

In this embodiment, when the first throttle component is disposed in the pipeline between the second port of the first passage and the second position, if the air conditioner system is heating, the outdoor ambient temperature is lower than or equal to the first set temperature value, the exhaust superheat degree of the compressor is less than or equal to the first set superheat degree for the first predetermined duration, then the first throttle component and the second throttle component are controlled to turn on, and the second port and the fourth port of the second four-way valve are controlled to be communicated, such that the refrigerant after passing through the indoor heat exchanger is divided into two branches, the refrigerant of one branch enters into the second passage of the auxiliary heat exchanger after passing through the indoor heat exchanger and being throttled by the second throttle component, the refrigerant of another branch can directly enter into the first passage of the auxiliary heat exchanger through the second four-way valve, and the refrigerants of the two branches exchange heat. That is, the refrigerant in the second passage is throttled by the second throttle component, and thus evaporates in the auxiliary heat exchanger, and the refrigerant in the first passage is condensed. This can increase the evaporation pressure and the evaporation temperature of the air conditioner system, effectively utilize the heat of the condensed refrigerant, improve the overall heat exchange amount of the air conditioner system and enhance the low temperature heating capacity of the air conditioner system.

According to an embodiment of the present disclosure, the controller is configured to: control the first throttle component and the second throttle component to turn on and control the first port and the fourth port of the second four-way valve to be communicated, if the air conditioner system is heating and the air conditioner system is in a small-load operation state, when the first throttle component is disposed in the pipeline between the second port of the first passage and the second position.

In this embodiment, when the first throttle component is disposed in the pipeline between the second port of the first passage and the second position, if the air conditioner system is heating in the small-load operation state, the first throttle component and the second throttle component are controlled to open, and the first port and the fourth port of the second four-way valve are controlled to be communicated, so that the refrigerant after passing through the first four-way valve is divided into two branches, the refrigerant of one branch enters the second passage of the auxiliary heat exchanger after passing through the indoor heat exchanger and being throttled by the second throttling component, the refrigerant of another branch can directly enter into the first passage of the auxiliary heat exchanger through the second four-way valve, and the refrigerants of the two branches exchange heat. That is, the refrigerant in the second passage is throttled by the second throttle component, and thus evaporates in the auxiliary heat exchanger, and the refrigerant in the first passage is condensed, thereby increasing the evaporation pressure and the evaporation temperature of the air conditioner system, and avoiding the damage to the compressor due to oil shortage caused by the air conditioner system being in the small-load heating operation. In the meantime, the overall heat exchange amount of the air conditioner unit can also be improved, and the low temperature heating capacity of the air conditioner system can be enhanced.

According to an embodiment of the present disclosure, the controller is configured to: control the first throttle component and the second throttle component to turn on, and control the second port and the fourth port of the second four-way valve to be communicated, if the air conditioner system is cooling, and the air conditioner system is in a small-load operation state, in the case that the first throttle component is disposed in the pipeline between the first port of the first passage and the fourth port of the second four-way valve.

In this embodiment, when the first throttle component is disposed in the pipeline between the first port of the first passage and the fourth port of the second four-way valve, if the air conditioner system is cooling under the small-load operation state, the first throttle component and the second throttle component are controlled to turn on, and the second port and the fourth port of the second four-way valve is controlled to be communicated, so that the refrigerant after passing through the outdoor heat exchanger is divided into two branches, the refrigerant of one branch enters the second passage of the auxiliary heat exchanger after passing through the outdoor heat exchanger and being throttled by the second throttle component, the refrigerant of another branch can directly enter the first passage of the auxiliary heat exchanger and enter the indoor heat exchanger through the second four-way valve, and the refrigerants of the two branches in the auxiliary heat exchanger exchange heat. That is, the refrigerant in the second passage is throttled by the second throttle component, and thus evaporates in the auxiliary heat exchanger, and the refrigerant in the first passage is condensed. Thus, this can increase the evaporation pressure and the evaporation temperature of the air conditioner system, and avoid the damage to the compressor due to oil damage caused by the air conditioner system being in the small-load cooling operation.

According to an embodiment of the present disclosure, a control method for controlling the air conditioner system according to any of the above embodiments is further provided, the control method comprising: acquiring an operation mode of the air conditioner system; determining whether the air conditioner system is in a small-load operation state, or detecting an outdoor ambient temperature and an exhaust superheat degree of the compressor; and controlling the first throttle component, the second throttle component and the second four-way valve, according to the operation mode of the air conditioner system, and the detected outdoor ambient temperature and the exhaust superheat degree, or whether the air conditioner system is in the small-load operation state.

In the control method of the air conditioner system according to an embodiment of the present disclosure, according to the operation mode of the air conditioner system, and whether the air conditioner system is in the small-load operation state, or the outdoor ambient temperature and the exhaust superheat degree, the first throttle component, the second throttle component and the second four-way valve are controlled, so that the first throttle component and the second throttle component is controlled to turn on and the respective ports of the second four-way valve are control to be in communication when the air conditioner system is in the small-load operation or heating at the low temperature. Thus, the auxiliary heat exchanger is connected to the refrigeration system for operation, thereby improving the overall heat exchange amount of the air conditioner system, and avoiding the damage to the compressor due to oil shortage caused by the air conditioner system being in a small-load operation state for a long period of time. Also, this can also enhance the low temperature heating capacity of the air conditioner system.

According to an embodiment of the present disclosure, the step of controlling the first throttling component, the second throttling and the second four-way valve according to the operation mode of the air conditioner system, and the detected outdoor ambient temperature and the exhaust superheat degree, comprises:

in a case where the first throttle component is disposed in the pipeline between the second port of the first passage and the second position, if the air conditioner system is heating, and it is detected that the outdoor ambient temperature is lower than or equal to the first set temperature value, the exhaust superheat degree of the compressor is less than or equal to the first set superheat degree for the first predetermined duration, controlling the first throttle component and the second throttle component to turn on, and controlling the second port and the fourth port of the second four-way valve to be communicated.

In this embodiment, when the first throttle component is disposed in the pipeline between the second port of the first passage and the second position, if the air conditioner system is heating, the outdoor ambient temperature is lower than or equal to the first set temperature value, and the exhaust superheat degree of the compressor is less than or equal to the first set superheat degree for the first predetermined duration, the first throttle component and the second throttle component are controlled to turn on, and the second port and the fourth port of the second four-way valve is controlled to be communicated, such that the refrigerant after passing through the indoor heat exchanger is divided into two branches, the refrigerant of one branch enters the second passage of the auxiliary heat exchanger after passing through the indoor heat exchanger and being throttled by the second throttle component, the refrigerant of another branch can directly enter the first passage of the auxiliary heat exchanger through the second four-way valve, and the refrigerants of the two branches exchange heat. That is, the refrigerant in the second passage is throttled by the second throttle component and thus evaporates in the auxiliary heat exchanger, and the refrigerant in the first passage is condensed, which can increase the evaporation pressure and the evaporation temperature of the air conditioner system, and effectively utilize the heat of the condensed refrigerant. This improves the overall heat exchange amount of the air conditioner system and enhances the low temperature heating capacity of the air conditioner system.

Further, after controlling the first throttle component and the second throttle component to turn on, the method further includes: controlling the first throttle component and the second throttle component to close, when it is detected that the exhaust superheat degree of the compressor is larger than or equal to a second set superheat degree for a second predetermined duration or the outdoor ambient temperature is larger than or equal to a second set temperature value.

According to this embodiment, when it is detected that the exhaust superheat degree of the compressor is larger than or equal to the second set superheat degree for the second predetermined duration, or it is detected that the outdoor ambient temperature is larger than or equal to the second set temperature value, it indicates that the air conditioner system is not heating at the low temperature. At this time, the first throttle component and the second throttle component can be controlled to turn off, such that the air conditioner system operates in a normal manner.

According to an embodiment of the present disclosure, the step of controlling the first throttle component and the second throttle component according to the operation mode of the air conditioner system and whether the air conditioner system is in the small-load operation state include:

in a case where the first throttle component is disposed in the pipeline between the second port of the first passage and the second position, if the air conditioner system is heating, and the air conditioner system is determined to be in the small-load operation state, controlling the first throttle component and the second throttle component to turn on, and controlling the first port and the fourth port of the second four-way valve to be communicated.

In this embodiment, when the first throttle component is disposed in the pipeline between the second port of the first passage and the second position, if the air conditioner system is heating under the small-load operation state, the first throttle component and the second throttle component are controlled to open, and the first port and the fourth port of the second four-way valve are controlled to be communicated, so that the refrigerant after passing through the first four-way valve is divided into two branches, the refrigerant of one branch enters the second passage of the auxiliary heat exchanger after passing through the indoor heat exchanger and being throttled by the second throttling component, the refrigerant of another branch can directly enter the first passage of the auxiliary heat exchanger through the second four-way valve, and the refrigerants of the two branches exchange heat. That is, the refrigerant in the second passage is throttled by the second throttle component and thus evaporates in the auxiliary heat exchanger, and the refrigerant in the first passage is condensed, which can increase the evaporation pressure and the evaporation temperature of the air conditioner system, and avoid the damage to the compressor due to oil shortage caused by the air conditioner system being in the small-load heating operation. Also, it can improve the overall heat exchange amount of the air conditioner unit and enhance the low temperature heating capacity of the air conditioner system.

According to an embodiment of the present disclosure, the step of controlling the first throttle component and the second throttle component according to the operation mode of the air conditioner system and whether the air conditioner system is in the small-load operation state includes:

in a case where the first throttle component is disposed in the pipeline between the first port of the first passage and the fourth port of the second four-way valve, if the air conditioner system is cooling, and the air conditioner system is determined to be in the small-load operation state, controlling the first throttle component and the second throttle component to open, and controlling the second port and the fourth port of the second four-way valve to be communicated.

In this embodiment, when the first throttle component is disposed in the pipeline between the first port of the first passage and the fourth port of the second four-way valve, if the air conditioner system is cooling under the small-load operation state, the first throttle component and the second throttle component are controlled to open, and the second port and the fourth port of the second four-way valve is controlled to be communicated, so that the refrigerant after passing through the outdoor heat exchanger is divided into two branches, the refrigerant of one branch enters the second passage of the auxiliary heat exchanger after passing through the outdoor heat exchanger and being throttled by the second throttle component, the refrigerant of another branch can directly enter the first passage of the auxiliary heat exchanger and enter the indoor heat exchanger through the second four-way valve, and the refrigerants of the two branches in the auxiliary heat exchanger exchange heat. That is, the refrigerant in the second passage is throttled by the second throttle component and thus evaporates in the auxiliary heat exchanger, and the refrigerant in the first passage is condensed. Thus, this can increase the evaporation pressure and the evaporation temperature of the air conditioner system, and avoid the damage to the compressor due to oil shortage caused by the air conditioner system being in the small-load cooling operation.

According to an embodiment of the present disclosure, after controlling the first throttle component and the second throttle component to open, the method further comprises: determining whether the air conditioner system exits the small-load operation state; and when the system exits the small-load operating state, controlling the first throttle component and the second throttle component to close.

In this embodiment, when it is determined that the air conditioner system exits the small-load operation state, the first throttle component and the second throttle component are controlled to close, so that the air conditioner system can operate in a normal operation mode.

In an embodiment of the present disclosure, the step of determining whether the air conditioner system exits the small-load operation state comprises: determining whether a sum of capability requirements of all of operating indoor units in the air conditioner system is larger than or equal to a first value for a third predetermined duration; and determining that the air conditioner system exits the small-load operation state when the sum of the capability requirements of all of the operating indoor units is larger than or equal to the first value for the third predetermined duration.

The sum of the capacity requirements of all of the operating indoor units can be expressed either directly by the actual numerical value of the capacity requirements or by the ratio (i.e., the ratio of the actual numerical value of the capacity requirements of all of the operating indoor units and the total capacity requirement which the air conditioner system can provide). When it is expressed by the actual numerical value of the capability requirement, the first value is the actual numerical value; when it is expressed by the form of the ratio, the first value is a constant between 0 and 1.

In another embodiment of the present disclosure, whether the air conditioner system exits the small-load operation state may be determined according to the number of the indoor units in the operation state. For example, when the number of the indoor units in the operation state is larger, it may be determined that the air conditioner system exits the small-load operation state.

According to an embodiment of the present disclosure, the step of determining whether the air conditioner system is in the small-load operation state comprises: determining whether the sum of capability requirements of all of operating indoor units in the air conditioner system is less than or equal to a second value for a fourth predetermined duration; and determining that the air conditioner system is in the small-load operating state, when the sum of capability requirements of all of the operating indoor units is less than or equal to the second value for the fourth predetermined duration.

The sum of the capacity requirements of all of the operating indoor units can be expressed either directly by the actual numerical value of the capacity requirements or by the ratio (i.e., the ratio of the actual numerical value of the capacity requirements of all of the operating indoor units and the total capacity requirement which the air conditioner system can provide). When the sum is expressed by the actual numerical value of the capability requirement, the second value is the actual numerical value; when the sum is expressed by the form of the ratio, the second value is a constant between 0 and 1.

In another embodiment of the present disclosure, whether the air conditioner system is in the small-load operation state may be determined according to the number of the indoor units in the operation state. For example, when the number of the indoor units in the operation state is smaller, the air conditioner system may be determined to be in the small-load operation state.

According to an embodiment of the present disclosure, after controlling the first throttle component and the second throttle component to open, the method further comprises: detecting temperature values of a second port and a first port of the second passage of the auxiliary heat exchanger; and adjusting an opening degree of the second throttle component according to the temperature values of the second port and the first port of the second passage of the auxiliary heat exchanger.

In this embodiment, since the second passage of the auxiliary heat exchanger is mainly for the evaporation of the refrigerant, and the temperature values of the second port and the first port of the second passage of the auxiliary heat exchanger reflect the superheat degree of the evaporation side of the auxiliary heat exchanger, by adjusting the opening degree of the second throttle component according to the temperature values of the second port and the first port of the second passage of the auxiliary heat exchanger, it can be ensured that the amount of refrigerant flowing through the second passage is in the reasonable range.

According to an embodiment of the present disclosure, the step of adjusting the opening degree of the second throttle component according to the temperature values of the second port and the first port of the second passage of the auxiliary heat exchanger comprises: calculating a temperature difference between the temperature of second port of the second passage and the temperature of first port of the second passage;

reducing the opening degree of the second throttle component to a first opening degree, during the process in which the temperature difference rises to a first temperature value, and the process in which the temperature difference decreases from a second temperature value; controlling the opening degree of the second throttle component to remain unchanged, during the process in which the temperature difference increases from the first temperature value to the third temperature value, and in the process in which the temperature difference decreases from the fourth temperature value to the second temperature value; and increasing the opening degree of the second throttle component to a second opening degree, during the process in which the temperature difference continues to rise from the third temperature value, and during the process in which the temperature difference drops to the fourth temperature value.

In this embodiment, during the rising process, the temperature difference between the second port and the first port of the second passage of the auxiliary heat exchanger is divided into three sections, that is, the first temperature value or less, the first temperature value to the third temperature value, and the third temperature value or more; during the falling process, the temperature difference between the second port and the first port of the second passage of the auxiliary heat exchanger is divided into three sections, that is, dropping to the fourth temperature value, the fourth temperature value to the second temperature value, and the second temperature value or less. The larger the temperature difference between the second port and the first port of the second passage of the auxiliary heat exchanger is, the more the refrigerant in the second passage is required. Therefore, the opening degree of the second throttle component can be appropriately increased. Conversely, if the temperature difference between the second port and the first port of the second passage of the auxiliary heat exchanger is smaller, the less amount of refrigerant in the second passage is required. Thus, the opening degree of the second throttle component can be appropriately reduced.

According to an embodiment of the present disclosure, after controlling the first throttle component and the second throttle component to turn on, the method further comprises: detecting a temperature of a heat exchanger being currently used as a condenser in the air conditioner system, and detecting a tube temperature of the first passage of the auxiliary heat exchanger; calculating an average of the temperature of the heat exchanger being currently used as the condenser in the air conditioner system and the tube temperature of the first passage of the auxiliary heat exchanger; and adjusting the opening degree of the first throttle component according to the tube temperature of the first passage of the auxiliary heat exchanger and the average.

In this embodiment, if the air conditioner system operates in the heating mode, the indoor heat exchanger of the indoor unit in the operation state is used as a condenser, and if the air conditioner system operates in the cooling mode, the outdoor heat exchanger in the outdoor unit is used as a condenser. The average of the temperature of the heat exchanger being currently used as the condenser in the air conditioner system and the tube temperature of the first passage (as the condensation side of the auxiliary heat exchanger) of the auxiliary heat exchanger is calculated, and the opening degree of the first throttle component is adjusted according to the tube temperature of the first passage of the auxiliary heat exchanger and the calculated average, so that the tube temperature of the first passage of the auxiliary heat exchanger can be indirectly controlled by adjusting the opening degree of the first throttle component. Thus, it is ensured that the tube temperature of the first passage of the auxiliary heat exchanger is adapted to the average of temperatures of all of the condensers in the air conditioner system, and the tube temperature of the first passage of the auxiliary heat exchanger is prevented from being too low or too high.

According to an embodiment of the present disclosure, the step of adjusting the opening degree of the first throttle component according to the tube temperature of the first passage of the auxiliary heat exchanger and the average comprises: increasing the opening degree of the first throttle component, when the tube temperature of the first passage of the auxiliary heat exchanger is lower than the difference between the average and the first predetermined value; controlling the opening degree of the first throttle component to remain unchanged, when the tube temperature of the first passage of the auxiliary heat exchanger is larger than or equal to the difference between the average and the first predetermined value, and lower than or equal to the sum of the average and the second predetermined value; and reducing the opening degree of the first throttle component, when the tube temperature of the first passage of the auxiliary heat exchanger is larger than the sum of the average and the second predetermined value.

In this embodiment, when the tube temperature of the first passage of the auxiliary heat exchanger is lower than the difference between the average and the first predetermined value, it indicates that the tube temperature of the first passage of the auxiliary heat exchanger is lower, that is, the amount of refrigerant is less. Thus, the opening degree of the first throttle component can be increased. Conversely, when the tube temperature of the first passage of the auxiliary heat exchanger is larger than the sum of the above average and the second predetermined value, it indicates that tube temperature of the first passage of the auxiliary heat exchanger is higher, that is, the amount of refrigerant is more. Thus, the opening degree of the first throttle component can be reduced. When the tube temperature of the first passage of the auxiliary heat exchanger is higher than or equal to the difference between the above average and the first predetermined value, and lower than or equal to the sum of the above average and the second predetermined value, it indicates that the tube temperature of the first passage of the auxiliary heat exchanger is within a normal range. Therefore, the opening degree of the first throttle component can be controlled to remain unchanged.

According to an embodiment of the present disclosure, there is also provided a control device of an air conditioner system, for controlling an air conditioner system according to any of the above embodiments, the control device comprising: an acquisition unit, configured to acquire an operation mode of the air conditioner system; a determination unit, configured to determine whether the air conditioner system is in a small-load operation state; or a first detection unit, configured to detect an outdoor ambient temperature and an exhaust superheat degree of the compressor; and a control unit, configured to control the first throttle component, the second throttle component, and the second four-way valve, according to the operation mode of the air conditioner system, and the outdoor ambient temperature and the exhaust superheat degree detected by the first detection unit or whether the air conditioner system is in the small-load operating state.

In the control device of the air conditioner system according to an embodiment of the present disclosure, according to an operation mode of the air conditioner system, and whether the air conditioner system is in the small-load operation state, or the outdoor environment temperature and the exhaust superheat degree, the first throttle component, the second throttle component and the second four-way valve are controlled, so that when the air conditioner system is in the small-load operation or the low-temperature heating operation, the first throttle component and the second throttle component are controlled to open, the respective ports of the second four-way valve are controlled to be communicated, and the auxiliary heat exchanger is connected to the refrigeration system for operation, thereby improving the overall heat exchange capacity of the air conditioner system, and avoiding the damage to the compressor due to oil shortage caused by the air conditioner system being in the small-load operation state for a long period of time. Also, the low temperature heating capacity of the air conditioner system is enhanced.

According to an embodiment of the present disclosure, the control unit is configured to: control the first throttle component and the second throttle component to turn on, and control the second port and the fourth port of the second four-way valve to be communicated, if the air conditioner system is heating, and the first detecting unit detects that the outdoor ambient temperature is lower than or equal to a first set temperature value, and the exhaust superheat degree of the compressor is less than or equal to a first set superheat degree for a first predetermined duration, when the first throttle component is disposed in the pipeline between the second port of the first passage and the second position.

In this embodiment, when the first throttle component is disposed in the pipeline between the second port of the first passage and the second position, if the air conditioner system is heating, the outdoor ambient temperature is lower than or equal to the first set temperature value, and the exhaust superheat degree of the compressor is less than or equal to the first set superheat degree for the first predetermined duration, then the first throttle component and the second throttle component are controlled to open, and the second port and the fourth port of the second four-way valve are controlled to be communicated, such that the refrigerant after passing through the indoor heat exchanger is divided into two branches, the refrigerant of one branch enters into the second passage of the auxiliary heat exchanger after passing through the indoor heat exchanger and being throttled by the second throttle component, the refrigerant of another branch can directly enter the first passage of the auxiliary heat exchanger through the second four-way valve, and the refrigerants of the two branches exchange heat. That is, the refrigerant in the second passage is throttled by the second throttle component and thus evaporates in the auxiliary heat exchanger, and the refrigerant in the first passage is condensed, which can increase the evaporation pressure and the evaporation temperature of the air conditioner system, and effectively utilize the heat of the condensed refrigerant. This improves the overall heat exchange amount of the air conditioner system and enhances the low temperature heating capacity of the air conditioner system.

Further, the control unit is further configured to control the first throttle component and the second throttle component to close, if the first detection unit detects that the exhaust superheat degree of the compressor is larger than or equal to the second set superheat degree for a second predetermined duration, or that the outdoor ambient temperature is higher than or equal to a second set temperature value, after the first throttle component and the second throttle component are controlled to turn on.

In this embodiment, when it is detected that the exhaust superheat degree of the compressor is larger than or equal to the second set superheat degree for the second predetermined duration, or that the outdoor ambient temperature is higher than or equal to the second set temperature value, it indicates that the air conditioner system is not in the low-temperature heating operation. In this case, the first throttle component and the second throttle component can be controlled to close such that the air conditioner system operates in a normal manner.

According to an embodiment of the present disclosure, the control unit is configured to: control the first throttle component and the second throttle component to turn on, and control the first port and the fourth port of the second four-way valve to be in communication, if the air conditioner system is heating, and the determination unit determines that the air conditioner system is in the small-load operation state, in the case that the first throttle component is disposed in the pipeline between the second port of the first passage and the second position.

In this embodiment, when the first throttle component is disposed in the pipeline between the second port of the first passage and the second position, if the air conditioner system is heating under the small-load operation state, the first throttle component and the second throttle component are controlled to turn on, and the first port and the fourth port of the second four-way valve are controlled to be in communication, so that the refrigerant after passing through the first four-way valve is divided into two branches, the refrigerant of one branch enters the second passage of the auxiliary heat exchanger after passing through the indoor heat exchanger and being throttled by the second throttling component, the refrigerant of another branch can directly enter the first passage of the auxiliary heat exchanger through the second four-way valve, and the refrigerants of the two branches exchange heat. That is, the refrigerant in the second passage is throttled by the second throttle component and thus evaporates in the auxiliary heat exchanger, and the refrigerant in the first passage is condensed, which can increase the evaporation pressure and the evaporation temperature of the air conditioner system, and avoid the damage to the compressor due to oil shortage caused by the air conditioner system being in the small-load heating operation. Also, this can also improve the overall heat exchange amount of the air conditioner unit, and enhance the low temperature heating capacity of the air conditioner system.

According to an embodiment of the present disclosure, the control unit is configured to: control the first throttle component and the second throttle component to turn on, and control the second port and the fourth port of the second four-way valve to be in communication, if the air conditioner system is cooling, and the determination unit determines that the air conditioner system is in the small-load operation state, in the case that the first throttle component is disposed in the pipeline between the first port of the first passage and the fourth port of the second four-way valve.

In this embodiment, when the first throttle component is disposed in the pipeline between the first port of the first passage and the fourth port of the second four-way valve, if the air conditioner system is cooling under the small-load operation state, the first throttle component and the second throttle component are controlled to open, and the second port and the fourth port of the second four-way valve are controlled to be in communication, so that the refrigerant after passing through the outdoor heat exchanger is divided into two branches, the refrigerant of one branch enters the second passage of the auxiliary heat exchanger after passing through the outdoor heat exchanger and being throttled by the second throttle component, the refrigerant of another branch can directly enter the first passage of the auxiliary heat exchanger and enter the indoor heat exchanger through the second four-way valve, and the refrigerants of the two branches in the auxiliary heat exchanger exchange heat. That is, the refrigerant in the second passage is throttled by the second throttle component and thus evaporates in the auxiliary heat exchanger, and the refrigerant in the first passage is condensed, thereby increasing the evaporation pressure and the evaporation temperature of the air conditioner system, and avoiding the damage to the compressor due to oil shortage caused by the air conditioner system being in the small-load heating operation.

According to an embodiment of the present disclosure, the determination unit is further configured to determine whether the air conditioner system exits the small-load operation state after the control unit controls the first throttle component and the second throttle component to turn on; and the control unit is further configured to control the first throttle component and the second throttle component to close when the air conditioner system exits the small-load operation state.

In this embodiment, when it is determined that the air conditioner system exits the small-load operation state, the first throttle component and the second throttle component are controlled to close, so that the air conditioner system can operate in a normal operation mode.

In an embodiment of the present disclosure, the determination unit is configured to: determine whether a sum of capability requirements of all of operating indoor units in the air conditioner system is larger than or equal to a first value for a third predetermined duration; and determine that the air conditioner system exits the small-load operation state, when the sum of the capability requirements of all the operating indoor units is larger than or equal to the first value for the third predetermined duration.

In another embodiment of the present disclosure, whether the air conditioner system exits the small-load operation state may be determined according to the number of the indoor units in the operation state. For example, when the number of the indoor units in the operation state is larger, it may be determined that the air conditioner system exits the small-load operation state.

According to an embodiment of the present disclosure, the determination unit is further configured to: determine whether the sum of capability requirements of all of the operating indoor units in the air conditioner system is less than or equal to a second value for a fourth predetermined duration; and determine that the air conditioner system is in the small-load operation state, when the sum of capability requirements of all of the operating indoor units is less than or equal to the second value for the fourth predetermined duration.

In another embodiment of the present disclosure, whether the air conditioner system is in the small-load operation state may be also determined according to the number of indoor units in the operation state. For example, when the number of indoor units in the operation state is smaller, the air conditioner system may be determined to be in the small-load operation state.

According to an embodiment of the present disclosure, the control device of the air conditioner system further comprises: a second detection unit configured to detect temperature values of a second port and a first port of the second passage of the auxiliary heat exchanger; and a first adjusting unit configured to adjust an opening degree of the second throttle component according to the temperature values of the second port and the first port of the second passage of the auxiliary heat exchanger.

In this embodiment, since the second passage of the auxiliary heat exchanger is mainly for the evaporation of the refrigerant, and the temperature values of the second port and the first port of the second passage of the auxiliary heat exchanger reflect the superheat degree of the evaporation side of the auxiliary heat exchanger, by adjusting the opening degree of the second throttle component according to the temperature values of the second port and the first port of the second passage of the auxiliary heat exchanger, it is ensured that the amount of refrigerant flowing through the second passage is in the reasonable range.

According to an embodiment of the present disclosure, the first adjusting unit comprises: a first calculation unit configured to calculate a temperature difference between the second port and the first port of the second passage; and an execution unit configured to reduce the opening degree of the second throttle component to a first opening degree, during the process in which the temperature difference rises to a first temperature value, and the process in which the temperature difference decreases from a second temperature value; control the opening degree of the second throttle component to remain unchanged, during the process in which the temperature difference increases from the first temperature value to the third temperature value, and in the process in which the temperature difference decreases from the fourth temperature value to the second temperature value; and increase the opening degree of the second throttle component to a second opening degree, during the process in which the temperature difference continues to rise from the third temperature value, and during the process in which the temperature difference drops to the fourth temperature value.

In this embodiment, during the rising process, the temperature difference between the second port and the first port of the second passage of the auxiliary heat exchanger is divided into three sections, that is, the first temperature value or less, the first temperature value to the third temperature value, and the third temperature value or more; during the falling process, the temperature difference between the second port and the first port of the second passage of the auxiliary heat exchanger is divided into three sections, that is, decreasing to the fourth temperature value, the fourth temperature value to the second temperature value, and the second temperature value or less. The larger the temperature difference between the second port and the first port of the second passage of the auxiliary heat exchanger is, the more the refrigerant in the second passage is required. Therefore, the opening degree of the second throttle component can be appropriately increased. Conversely, if the temperature difference between the second port and the first port of the second passage of the auxiliary heat exchanger is smaller, the less amount of refrigerant in the second passage is required. Thus, the opening degree of the second throttle component can be appropriately reduced.

According to an embodiment of the present disclosure, the control device of the air conditioner system further comprises: a third detection unit configured to detect a temperature of a heat exchanger being currently used as a condenser in the air conditioner system, and detect a tube temperature of the first passage of the auxiliary heat exchanger, after the control unit controls the first throttle component and the second throttle component to turn on; a second calculation unit configured to calculate an average of the temperature of the heat exchanger being currently used as the condenser in the air conditioner system and the tube temperature of the first passage of the auxiliary heat exchanger; and a second adjusting unit configured to adjust the opening degree of the first throttle component according to the tube temperature of the first passage of the auxiliary heat exchanger and the average.

In this embodiment, if the air conditioner system operates in the heating mode, the indoor heat exchanger of the indoor unit in the operation state is used as a condenser; if the air conditioner system operates in the cooling mode, the outdoor heat exchanger in the outdoor unit is used as a condenser. The average of the temperature of the heat exchanger being currently used as the condenser in the air conditioner system and the tube temperature of the first passage (as the condensation side of the auxiliary heat exchanger) of the auxiliary heat exchanger is calculated, and the opening degree of the first throttle component is adjusted according to the tube temperature of the first passage of the auxiliary heat exchanger and the calculated average, so that the tube temperature of the first passage of the auxiliary heat exchanger can be indirectly controlled by adjusting the opening degree of the first throttle component. Thus, it is ensured that the tube temperature of the first passage of the auxiliary heat exchanger is adapted to the average of temperatures of all of the condenser in the air conditioner system, and the tube temperature of the first passage of the auxiliary heat exchanger is prevented from being too low or too high.

According to an embodiment of the present disclosure, the second adjusting unit is configured to: increase the opening degree of the first throttle component, when the tube temperature of the first passage of the auxiliary heat exchanger is lower than the difference between the average and the first predetermined value; control the opening degree of the first throttle component to remain unchanged, when the tube temperature of the first passage of the auxiliary heat exchanger is higher than or equal to the difference between the average and the first predetermined value, and lower than or equal to the sum of the average and the second predetermined value; reduce the opening degree of the first throttle component, when the tube temperature of the first passage of the auxiliary heat exchanger is higher than the sum of the average and the second predetermined value.

In this embodiment, when the tube temperature of the first passage of the auxiliary heat exchanger is lower than the difference between the average and the first predetermined value, it indicates that the tube temperature of the first passage of the auxiliary heat exchanger is lower, that is, the amount of refrigerant is less. Thus, the opening degree of the first throttle component can be increased. Conversely, when the tube temperature of the first passage of the auxiliary heat exchanger is higher than the sum of the above average and the second predetermined value, it indicates that tube temperature of the first passage of the auxiliary heat exchanger is higher, that is, the amount of refrigerant is more. Thus, the opening degree of the first throttle component can be reduced. When the tube temperature of the first passage of the auxiliary heat exchanger is higher than or equal to the difference between the above average and the first predetermined value, and lower than or equal to the sum of the above average and the second predetermined value, it indicates that the tube temperature of the first passage of the auxiliary heat exchanger is within a normal range. Therefore, the opening degree of the first throttle component can be controlled to remain unchanged.

BRIEF DESCRIPTION OF THE DRAWINGS

Embodiments of the present disclosure will become apparent and understandable from the following description of the embodiments in conjunction with the accompanying drawings, in which.

DETAILED DESCRIPTION OF THE EMBODIMENTS

Embodiments of the present disclosure can be understood more clearly, by a further detailed description of the present disclosure will be given below in combination with the accompanying drawings and embodiments.

Figure 1:
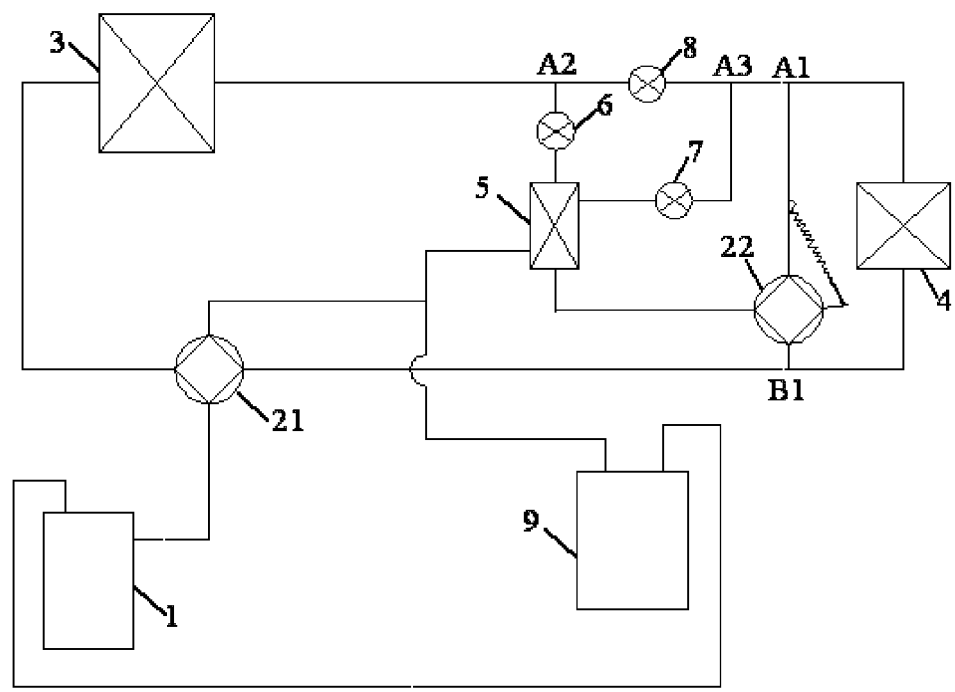
FIG. 1 is a schematic view showing the structure of an air conditioner system according to a first embodiment of the present disclosure.

FIG. 1 is a schematic view showing the structure of an air conditioner system according to a first embodiment of the present disclosure.

As shown in FIG. 1, an air conditioner system according to a first embodiment of the present disclosure includes: a refrigeration system comprising at least a compressor 1, a first four-way valve 21, an outdoor heat exchanger 3, and an indoor heat exchanger 4, a second four-way valve 22, an auxiliary heat exchanger 5, a first throttle component 6, and a second throttle component 7.

A first port of the second four-way valve 22 is connected to a pipeline between the first four-way valve 21 and the indoor heat exchanger 4 (the position of B1 in FIG. 1), and a second port of the second four-way valve 22 is connected to a first position (the position of A1 in FIG. 1) in a pipeline between the indoor heat exchanger 4 and the outdoor heat exchanger 3. The auxiliary heat exchanger 5 has a first passage and a second passage. A first port of the first passage is in communication with a fourth port of the second four-way valve 22, and a second port of the first passage of the auxiliary heat exchanger 5 is connected to a second position (the position of A2 in FIG. 1) in the pipeline between the indoor heat exchanger 4 and the outdoor heat exchanger 3. A first port of the second passage of the auxiliary heat exchanger 5 is connected to a third position (the position of A3 in FIG. 1) in the pipeline between the indoor heat exchanger 4 and the outdoor heat exchanger 3, and a second port of the second passage of the auxiliary heat exchanger 5 is connected to any position in the pipeline between the outdoor heat exchanger 3 and an return-air inlet of the compressor 1. The first throttle component 6 is disposed in a pipeline between the second port of the first passage of the auxiliary heat exchanger 5 and the second position, and the second throttle component 7 is disposed in a pipeline between the first port of the second passage of the auxiliary heat exchanger 5 and the third position. A third port of the second four-way valve 22 is in a blocked state.

Further, the refrigeration system further includes a third throttle component 8 and a gas-liquid separator 9. Four ports of the first four-way valve 21 are communicated with an exhaust outlet of the compressor 1, a first port of the outdoor heat exchanger 3, a first port of the indoor heat exchanger 4, and an inlet of the gas-liquid separator 9 respectively, a second port of the outdoor heat exchanger 3 is communicated with a second port of the indoor heat exchanger 4 through the third throttle component 8, and an outlet of the gas-liquid separator 9 is in communication with a return-air inlet of the compressor 1.

Further, the specific connection position of the second port of the second passage of the auxiliary heat exchanger 5 may be as follows:

1. As shown in FIG. 1, the second port of the second passage of the auxiliary heat exchanger 5 is connected to a pipe in which the inlet of the gas-liquid separator 9 is in communication with the first four-way valve 21.

Figure 2:
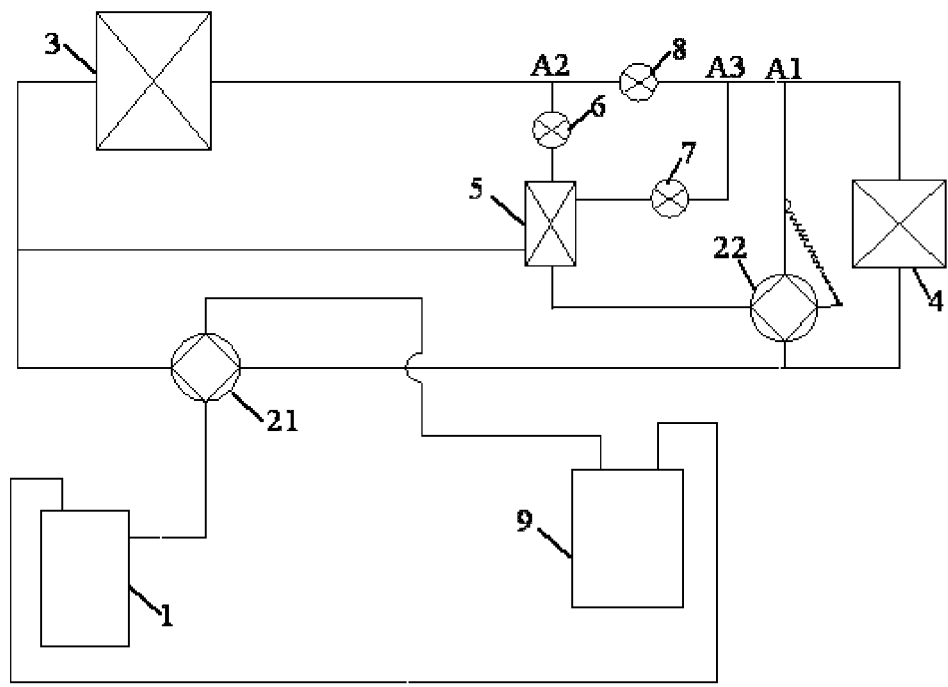
FIG. 2 is a schematic view showing the structure of an air conditioner system according to a second embodiment of the present disclosure.

2. As shown in FIG. 2, the second port of the second passage of the auxiliary heat exchanger 5 is connected to a pipe in which the first port of the outdoor heat exchanger 3 is in communication with the first four-way valve 21.

3. The second port of the second passage of the auxiliary heat exchanger 5 is connected to a pipe in which the outlet of the gas-liquid separator 9 is in communication with the return-air inlet of the compressor 1.

Figure 3:
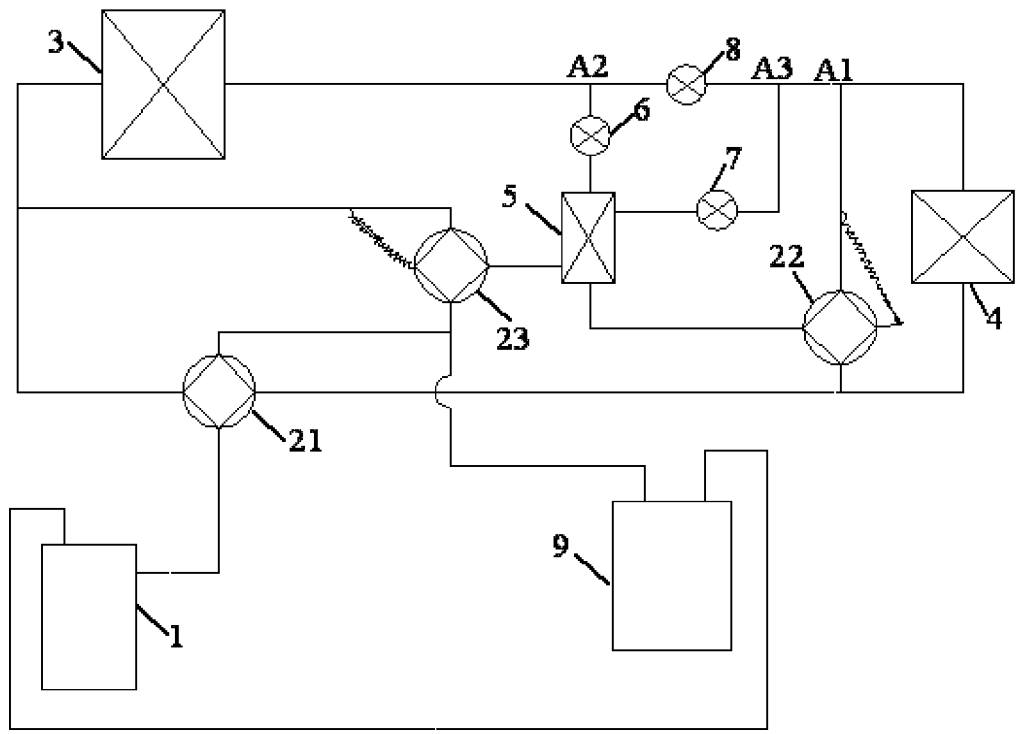
FIG. 3 is a schematic view showing the structure of an air conditioner system according to a third embodiment of the present disclosure.

4. As shown in FIG. 3, the second port of the second passage of the auxiliary heat exchanger 5 is connected to the first port of the third four-way valve 23, the second port of the third four-way valve 23 is connected to a pipe in which the first port of the outdoor heat exchanger 3 is in communication with the first four-way valve 21, and the fourth port of the third four-way valve 23 is connected to a pipe in which the inlet of the gas-liquid separator 9 is in communication with the first four-way valve 21. Based on the structure as shown in FIG. 3, it is possible to control whether the refrigerant passing through the second passage of the auxiliary heat exchanger 5 enters the gas-liquid separator 9 directly or after passing through the first four-way valve 21, by controlling the energization and de-energization of the third four-way valve 23. The third port of the third four-way valve 23 is in a blocked state.

In addition, the air conditioner system further includes: a controller (not shown in FIG. 1 to FIG. 3) connected to the first throttle component 6, the second throttle component 7, and the second four-way valve 22, being configured to control the first throttle component 6, the second throttle component 7, and the second four-way valve 22.

In an embodiment of the present disclosure, the controller is configured to: control the first throttle component 6 and the second throttle component 7 to turn on, and control the second port and the fourth port of the second four-way valve 22 to be communicated, if it is detected that the outdoor ambient temperature is lower than or equal to the first set temperature value, and the exhaust superheat degree of the compressor 1 is less than or equal to the first set superheat degree for the first predetermined duration, when the air conditioner system is heating.

When the air conditioner system is heating, the outdoor ambient temperature is lower than or equal to the first set temperature value, and the exhaust superheat degree of the compressor 1 is less than or equal to the first set superheat degree for the first predetermined duration, the throttle component 6 and the second throttle component 7 are controlled to turn on, and the second port and the fourth port of the second four-way valve 22 is controlled to be in communication, so that the refrigerant after passing through the indoor heat exchanger 4 is divided into two branches, the refrigerant of one branch enters into the second passage of the auxiliary heat exchanger 5 after passing through the indoor heat exchanger 4 and being throttled by the second throttle component 7, the refrigerant of another branch can directly enter into the first passage of the auxiliary heat exchanger 5 through the second four-way valve 22, and the refrigerants of the two branches exchange heat. That is, the refrigerant in the second passage is throttled by the second throttle component 7 and thus evaporates in the auxiliary heat exchanger 5, and the refrigerant in the first passage is condensed, which can increase the evaporation pressure and the evaporation temperature of the air conditioner system, and effectively utilize the heat of the condensed refrigerant. This improves the overall heat exchange amount of the air conditioner system and enhances the low temperature heating capacity of the air conditioner system.

According to another embodiment of the present disclosure, the controller is configured to: control the first throttle component 6 and the second throttle component 7 to open and control the first port and the fourth port of the second four-way valve 22 to be communicated, if the air conditioner system is in a small-load operation state, when the air conditioner system is heating.

When the air conditioner system is heating under the small-load operation state, the first throttle component 6 and the second throttle component 7 are controlled to open, and the first port and the fourth port of the second four-way valve 22 are controlled to be in communication, so that the refrigerant after passing through the first four-way valve 21 is divided into two branches, the refrigerant of one branch enters into the second passage of the auxiliary heat exchanger 5 after passing through the indoor heat exchanger 4 and being throttled by the second throttling component 7, the refrigerant of another branch can directly enter into the first passage of the auxiliary heat exchanger 5 through the second four-way valve 22, and the refrigerants of the two branches exchange heat. That is, the refrigerant in the second passage is throttled by the second throttle component 7 and thus evaporates in the auxiliary heat exchanger 5, and the refrigerant in the first passage is condensed, which can increase the evaporation pressure and the evaporation temperature of the air conditioner system, and avoid the damage to the compressor 1 due to oil shortage caused by the air conditioner system being in the small-load heating operation. Also, this can also improve the overall heat exchange amount of the air conditioner unit and enhance the low temperature heating capacity of the air conditioner system.

Figure 4:
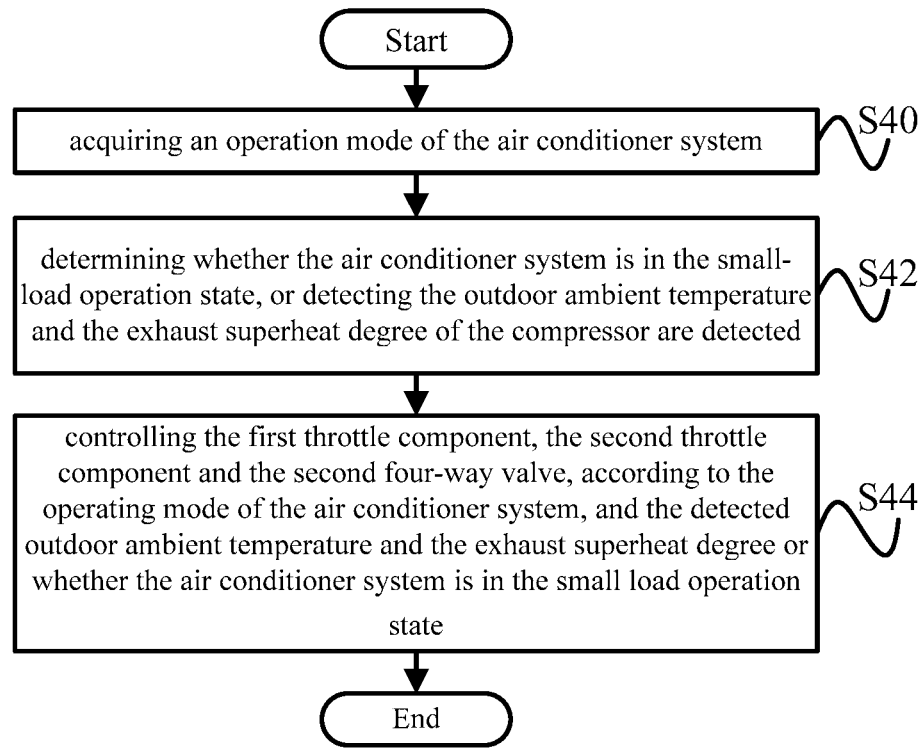
FIG. 4 is a flow chart showing a control method of an air conditioner system according to a first embodiment of the present disclosure.

Based on the structure of the air conditioner system as shown in any of FIG. 1 to FIG. 3, the controlling method according to the first embodiment of the present disclosure includes, as shown in FIG. 4:

at step 40, an operation mode of the air conditioner system is acquired;

at step 42, whether the air conditioner system is in the small-load operation state is determined, or the outdoor ambient temperature and the exhaust superheat degree of the compressor are detected.

In one embodiment of the present disclosure, the step of determining whether the air conditioner system is in a small-load operation state in step S42 includes: determining whether a sum of capability requirements of all of operating indoor units in the air conditioner system is less than or equal to a second value for a fourth predetermined duration; determining that the air conditioner system is in the small-load operation state when the sum of the capability requirements of all of operating indoor units is less than or equal to the second value for the fourth predetermined duration.

In another embodiment of the present disclosure, whether the air conditioner system is in the small-load operation state may be determined according to the number of the indoor units in the operation state. For example, when the number of indoor units in the operation state is smaller, the air conditioner system may be determined to be in the small-load operation state.

The exhaust superheat degree of the compressor equals to the exhaust temperature of the compressor minus the saturation temperature of the compressor, and the saturation temperature of the compressor can be determined by the exhaust pressure.

At step S44, according to the operating mode of the air conditioner system, and the detected outdoor ambient temperature and the exhaust superheat degree or whether the air conditioner system is in the small-load operation state, the first throttle component, the second throttle component and the second four-way valve are controlled.

The control of the step S44 includes the two following embodiments:

The First Embodiment

In an embodiment of the present disclosure, the step controlling the first throttle component, the second throttle component and the second four-way valve, according to the operation mode of the air conditioner system, and the detected outdoor ambient temperature and the exhaust superheat degree, in step S44, includes:

if the air conditioner system is in the heating mode, and it is detected that the outdoor ambient temperature is lower than or equal to the first set temperature value, and the exhaust superheat degree of the compressor is less than or equal to the first set superheat degree for the first predetermined duration, the first throttle component and the second throttle component are controlled to open, and the second port and the fourth port of the second four-way valve are controlled to be communicated.

In this embodiment, when the air conditioner system is in the heating operation, the outdoor ambient temperature is lower than or equal to the first set-temperature value, the exhaust superheat degree of the compressor is less than or equal to the first set superheat degree for the first predetermined duration, then the first throttle component and the second throttle component are controlled to open, and the second port and the fourth port of the second four-way valve are controlled to be communicated, such that the refrigerant after passing through the indoor heat exchanger is divided into two branches, the refrigerant of one branch enters into the second passage of the auxiliary heat exchanger after being throttled by the indoor heat exchanger and the second throttle component, the refrigerant of another branch can directly enter the first passage of the auxiliary heat exchanger through the second four-way valve, and the two branches of refrigerants exchange heat. That is, the refrigerant in the second passage is throttled by the second throttle component and thus evaporates in the auxiliary heat exchanger, and the refrigerant in the first passage is condensed, which can increase the evaporation pressure and the evaporation temperature of the air conditioner system, and effectively utilize the heat of the condensed refrigerant. This improves the overall heat exchange amount of the air conditioner system and enhances the low temperature heating capacity of the air conditioner system.

After the first throttle component and the second throttle component are controlled to open, the following step is included: controlling the first throttle component and the second throttle component to close, if it is detected that the exhaust superheat degree of the compressor is larger than or equal to the second set superheat degree for a second predetermined duration, or that the outdoor ambient temperature is higher than or equal to the second set temperature value.

In the embodiment, when it is detected that the exhaust superheat degree of the compressor is larger than or equal to the second set superheat degree for the second predetermined duration, or that the outdoor ambient temperature is higher than or equal to the second set temperature value, it indicates that the air conditioner system is not in the low-temperature heating operation. In this case, the first throttle component and the second throttle component can be controlled to close such that the air conditioner system operates in a normal manner.

The Second Embodiment

In an embodiment of the present disclosure, the step of controlling the first throttle component and the second throttle component according to an operation mode of the air conditioner system, and the air conditioner system is in a small-load operation state, in step S44, includes: controlling the first throttle component and the second throttle component to open, and controlling the first port and the fourth port of the second four-way valve to be in communication, if the air conditioner system is in the heating operation, and the air conditioner system is determined to be in the small-load operation state.

In this embodiment, when the air conditioner system is heating under the small-load operation state, the first throttle component and the second throttle component are controlled to open, and the first port and the fourth port of the second four-way valve are controlled to be in communication, so that the refrigerant after passing through the first four-way valve is divided into two branches, the refrigerant of one branch enters the second passage of the auxiliary heat exchanger after passing through the indoor heat exchanger and being throttled by the second throttling component, the refrigerant of another branch can directly enter the first passage of the auxiliary heat exchanger through the second four-way valve, and the refrigerants of the two branches exchange heat. That is, the refrigerant in the second passage is throttled by the second throttle component, and thus evaporates in the auxiliary heat exchanger, and the refrigerant in the first passage is condensed, which can increase the evaporation pressure and the evaporation temperature of the air conditioner system, and avoid the damage to the compressor due to oil shortage caused by the air conditioner system being in the small-load heating operation. Also, this can improve the overall heat exchange amount of the air conditioner unit, and enhance the low temperature heating capacity of the air conditioner system.

For the above two embodiments, when the first throttle component and the second throttle component are controlled to open, the following step is further included: determining whether the air conditioner system exits the small-load operation state; and controlling the first throttle component and the second throttle component to close when the air conditioner system exits the small-load operation state.

In this embodiment, when it is determined that the air conditioner system exits the small-load operation state, the first throttle component and the second throttle component are controlled to close, so that the air conditioner system can operate in a normal operation mode.

In an embodiment of the present disclosure, the step of determining whether the air conditioner system exits the small-load operation state includes: determining whether a sum of capability requirements of all of the operating indoor units in the air conditioner system is larger than or equal to a first value for a third predetermined duration; and determining that the air conditioner system exits the small-load operation state, when the sum of the capability requirements of all of the operating indoor units is larger than or equal to the first value for the third predetermined duration.

In another embodiment of the present disclosure, whether the air conditioner system exits the small-load operation state may be determined according to the number of the indoor units in the operation state. For example, when the number of the indoor units in the operation state is larger, it may be determined that the air conditioner system exits the small-load operation state.

In addition, after controlling the first throttle component and the second throttle component to open, the following step is further included: detecting temperature values of a second port and a first port of the second passage of the auxiliary heat exchanger; and adjusting an opening degree of the second throttle component according to the temperature values of the second port and the first port of the second passage of the auxiliary heat exchanger.

In this embodiment, since the second passage of the auxiliary heat exchanger is mainly for the evaporation of the refrigerant, and the temperature values of the second port and the first port of the second passage of the auxiliary heat exchanger reflect the superheat degree of the evaporation side of the auxiliary heat exchanger, by adjusting the opening degree of the second throttle component according to the temperature values of the second port and the first port of the second passage of the auxiliary heat exchanger, it is ensured that the amount of refrigerant flowing through the second passage is in the reasonable range.

Further, the step of adjusting the opening degree of the second throttle component according to the temperature values of the second port and the first port of the second passage of the auxiliary heat exchanger includes: calculating a temperature difference between the second port and the first port of the second passage; and reducing the opening degree of the second throttle component to a first opening degree, during the process in which the temperature difference rises to a first temperature value, and the process in which the temperature difference decreases from a second temperature value; controlling the opening degree of the second throttle component to remain unchanged, during the process in which the temperature difference increases from the first temperature value to the third temperature value, and in the process in which the temperature difference decreases from the fourth temperature value to the second temperature value; and increasing the opening degree of the second throttle component to a second opening degree, during the process in which the temperature difference continues to rise from the third temperature value, and during the process in which the temperature difference drops to the fourth temperature value.

In this embodiment, during the rising process, the temperature difference between the second port and the first port of the second passage of the auxiliary heat exchanger is divided into three sections, that is, the first temperature value or less, the first temperature value to the third temperature value, and the third temperature value or more; during the falling process, the temperature difference between temperature of the second port and that of the first port of the second passage of the auxiliary heat exchanger is divided into three sections, that is, falling to the fourth temperature value, the fourth temperature value to the second temperature value, and the second temperature value or less. The higher the temperature difference between the second port and the first port of the second passage of the auxiliary heat exchanger is, the more the refrigerant in the second passage is required. Therefore, the opening degree of the second throttle component can be appropriately adjusted. Conversely, if the temperature difference between the second port and the first port of the second passage of the auxiliary heat exchanger is smaller, the less amount of refrigerant in the second passage is required. Thus, the opening degree of the second throttle component can be appropriately adjusted.

Further, after controlling the first throttle component and the second throttle component to open, the following is included: detecting a temperature of an indoor heat exchanger of an indoor unit being in operation in the air conditioner system, and detecting a tube temperature of the first passage of the auxiliary heat exchanger; calculating an average of the temperature of the indoor heat exchanger of the indoor unit being in operation in the air conditioner system and the tube temperature of the first passage of the auxiliary heat exchanger; and adjusting the opening degree of the first throttle component according to the tube temperature of the first passage of the auxiliary heat exchanger and the average.

In the embodiment, the average of the temperature of the heat exchanger of the indoor unit being in operation in the air conditioner system and the tube temperature of the first passage of the auxiliary heat exchanger is calculated, and the opening degree of the first throttle component is adjusted according to the tube temperature of the first passage of the auxiliary heat exchanger and the calculated average, so that the tube temperature of the first passage of the auxiliary heat exchanger can be indirectly controlled by adjusting the opening degree of the first throttle component. Further, it is ensured that the tube temperature of the first passage of the auxiliary heat exchanger is adapted to the average of temperatures of all of the condenser in the air conditioner system (during the heating operation of the air conditioner system, the first passage of the auxiliary heat exchanger and the indoor heat exchanger of the indoor unit in operation are used as condensers), and the tube temperature of the first passage of the auxiliary heat exchanger is prevented from being too low or too high.

In addition, the step of adjusting the opening degree of the first throttle component according to the tube temperature of the first passage of the auxiliary heat exchanger and the average comprises: increasing the opening degree of the first throttle component, when the tube temperature of the first passage of the auxiliary heat exchanger is lower than the difference between the average and the first predetermined value; controlling the opening degree of the first throttle component to remain unchanged, when the tube temperature of the first passage of the auxiliary heat exchanger is higher than or equal to the difference between the average and the first predetermined value, and lower than or equal to the sum of the average and the second predetermined value; reducing the opening degree of the first throttle component, when the tube temperature of the first passage of the auxiliary heat exchanger is higher than the sum of the average and the second predetermined value.

In this embodiment, when the tube temperature of the first passage of the auxiliary heat exchanger is lower than the difference between the average and the first predetermined value, it indicates that the tube temperature of the first passage of the auxiliary heat exchanger is lower, that is, the amount of refrigerant is less. Thus, the opening degree of the first throttle component can be increased. Conversely, when the tube temperature of the first passage of the auxiliary heat exchanger is higher than the sum of the above average and the second predetermined value, it indicates that tube temperature of the first passage of the auxiliary heat exchanger is higher, that is, the amount of refrigerant is more. Thus, the opening degree of the first throttle component can be reduced. When the tube temperature of the first passage of the auxiliary heat exchanger is higher than or equal to the difference between the above average and the first predetermined value, and lower than or equal to the sum of the above average and the second predetermined value, it indicates that the tube temperature of the first passage of the auxiliary heat exchanger is within a normal range. Therefore, the opening degree of the first throttle component can be controlled to remain unchanged.

Figure 5:
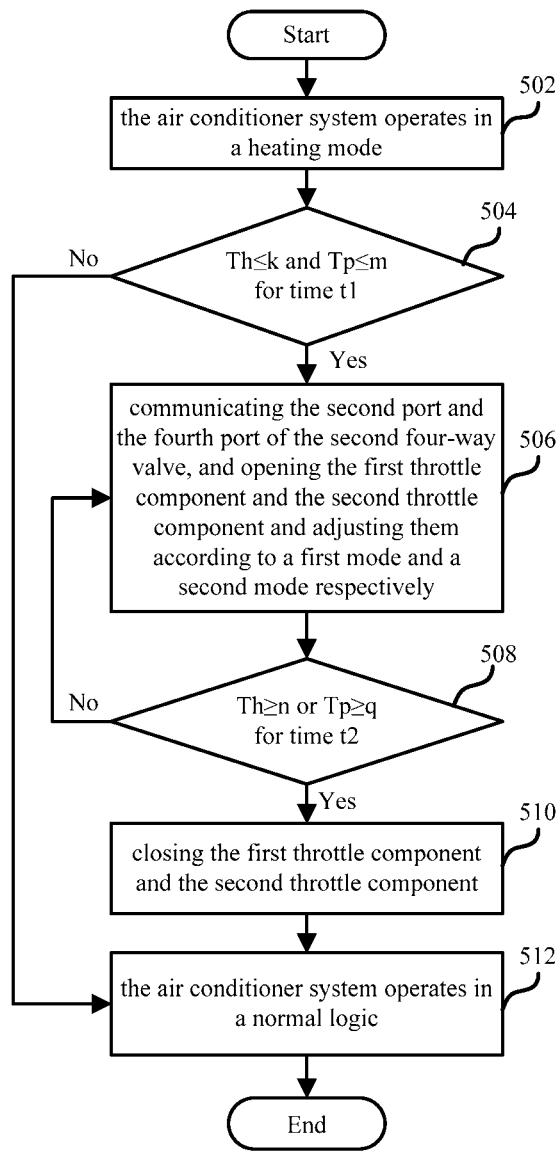
FIG. 5 is a flow chart showing a control method of an air conditioner system according to a second embodiment of the present disclosure.
Figure 6:
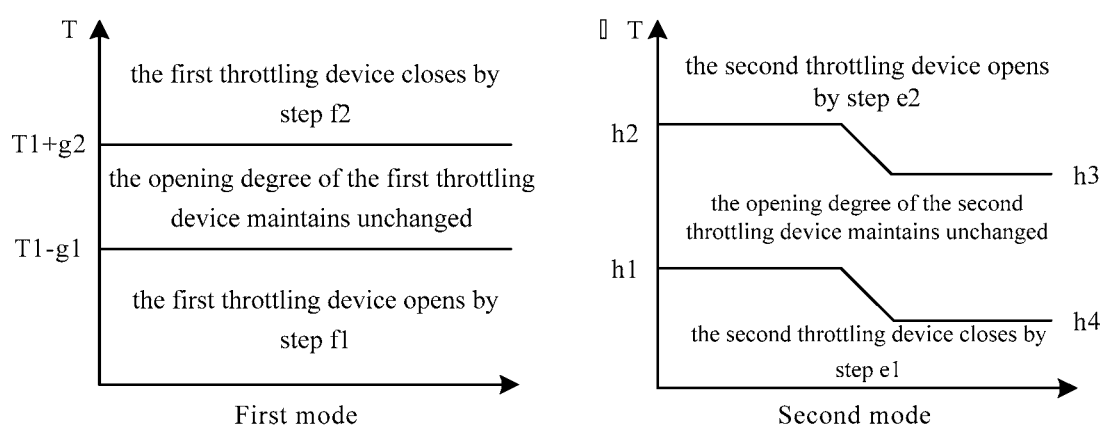
FIG. 6 is a schematic view showing a control way of a throttle component in an air conditioner system according to an embodiment of the present disclosure.

Based on the structure of the air conditioner system shown in any one of FIG. 1 to FIG. 3, the control method of the second embodiment of the present disclosure is as shown in FIG. 5, and includes:

at step 502, the air conditioner system operates in a heating mode;

at step 504, it is determined whether the outdoor ambient temperature Th is lower than or equal to k, and the exhaust superheat degree Tp of the compressor is less than or equal to m for t1 time. If so, step 506 is performed. Otherwise, step 512 is performed. In one embodiment of the disclosure, t1 may be 10 minutes;

at step 506, the second port and the fourth port of the second four-way valve is controlled to be in communication, and the opening degrees of the first throttle component and the second throttle component are adjusted according to a first mode and a second mode as shown in FIG. 6, respectively. The first throttle component and the second throttle component may be electronic expansion valves.

Specifically, the adjusting of a pair of first throttle devices according to the first mode shown in FIG. 6 is specifically: detecting the tube temperature T of the first passage (as the condensation side) of the auxiliary heat exchanger, detecting the central temperature of the indoor heat exchanger coil (being used as a condenser at this time) in the operating indoor unit in the air conditioner system, calculating the temperature average value T1 based on the detected temperature, and based on the temperature average value T1, adjusting the opening degree of the first throttle device as follows:

when $T<T1-g1$, controlling the first throttling device to open by step f1;

when $T1-g1 \leq T \leq T1+g2$, controlling the first throttle device to maintain the current opening degree;

when $T>T1+g2$, controlling the first throttling device to close by step f2.

f1 and f2 may be the same or different. In one embodiment of the present disclosure, f1=f2=40 steps. g1 and g2 may be the same or different. In one embodiment of the present disclosure, g1=g2=2° C.

The adjusting of the second throttle device according to the second mode shown in FIG. 6 is as follows:

calculating the superheat degree $\Delta T = T_{out} - T_{in}$ of the second passage (as the evaporation side) of the auxiliary heat exchanger, that is, taking the difference between the outlet temperature and the inlet temperature of the second passage as the superheat degree of the second passage, and based on the $\Delta T$, adjusting the opening degree of the second throttle device is as follows:

when $\Delta T$ rises to h1, controlling the second throttle device to close by e1 steps;

controlling the second throttle device to maintain the current opening degree when $\Delta T$ is raised from h1 to h2;

controlling the second throttle device to open e2 steps, when $\Delta T$ continues to rise from h2;

controlling the second throttle device to open the e2 steps, when the $\Delta T$ falls to h3;

controlling the second throttle device to maintain the current opening degree, when $\Delta T$ decreases from h3 to h4;

controlling the second throttle device to close e1 steps, when $\Delta T$ continues to fall from h4.

In one embodiment, e1 and e2 may be the same or different, and in one embodiment of the present disclosure, e1=e2=16 steps. In one embodiment of the disclosure, h1=2° C., h2=5° C., h3=4° C., h4=1° C.

The adjustment process of the first mode and the second mode may be performed periodically, for example, once every 2 minutes.

At step 508, it is determined whether the outdoor ambient temperature Th is larger than or equal to n, or the exhaust superheat degree Tp of the compressor is larger than or equal to q for time t2. If so, step 510 is performed; otherwise, step 506 is performed. In one embodiment of the disclosure, t2 can be 10 minutes.

At step 510, the first throttle component and the second throttle component are controlled to close.

At step 512, the air conditioner system operates in a normal logic.

The control method shown in FIG. 5 is further described below with reference to FIG. 1. When the air conditioner system is in the heating operation, the first four-way valve 21 is powered on, and the air exhausted by the compressor 1 passes through the first four-way valve 21, enters into the indoor heat exchanger 4, becomes a high-pressure medium-temperature refrigerant after being condensed and releasing heat, and enters the outdoor heat exchanger 3 after being throttled by the third throttle component 8. At this time, the second port and the fourth port of the second four-way valve are controlled to be in communicated (for example, the second four-way valve is controlled to be in a power-off state), and the refrigerant after passing through the indoor heat exchanger 4 is divided into two branches: the high-pressure medium-temperature refrigerant not being throttled enters the auxiliary heat exchanger 5 through the second four-way valve 22, and releases heat in the auxiliary heat exchanger 5; the refrigerant of another branch is throttled by the second throttle component 7 to enter the auxiliary heat exchanger 5, absorbs heat in the auxiliary heat exchanger 5 to obtain a higher evaporation temperature, and mixes with the refrigerant from the outdoor heat exchanger 3 as an evaporator to enter the air return side of the compressor 1. In this way, the overall evaporation pressure and evaporation temperature of the system are improved, and the heat of the condensed refrigerant is effectively utilized to increase the overall heat exchange amount of the unit and enhance the ability of low temperature heating.

Figure 7:
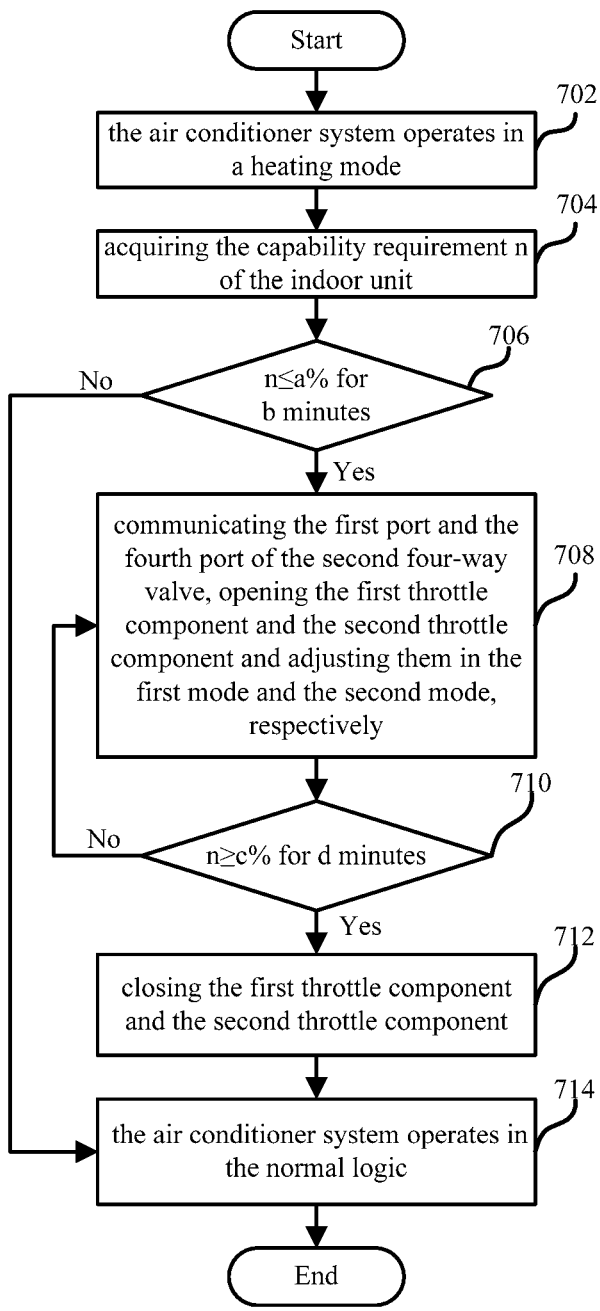
FIG. 7 is a flow chart showing a control method of an air conditioner system according to a third embodiment of the present disclosure.

Based on the structure of the air conditioner system shown in any one of FIG. 1 to FIG. 3, the control method of the third embodiment of the present disclosure is as shown in FIG. 7 and includes:

at step 702, the air conditioner system operates in a heating mode;

at step 704, the capability requirement n of the indoor unit is acquired;

at step 706, it is determined whether the capability requirement n of the indoor unit is less than or equal to a % for b minutes. If so, it is determined that the air conditioner system is in the small-load operation state, and then step 708 is performed. Otherwise, step 714 is performed;

at step 708, when it is determined that the air conditioner system is in the small-load operation state, the first port and the fourth port of the second four-way valve are controlled to be in communication, the first throttle component and the second throttle component are controlled to open, and the opening degrees of the first throttle component and the second throttle component are adjusted respectively, in the first mode and the second mode shown in the FIG. 6. The first throttle component and the second throttle component may be electronic expansion valves.

The adjustment process in the above first mode and the second mode may be performed periodically, for example, once every 2 minutes.

At step 710, it is determined whether the capability requirement n of the indoor unit is larger than or equal to c % for d minutes. If so, it is determined that the air conditioner system exits the small-load operation state, and then step 712 is performed; otherwise, step 708 is continued to be performed.

At step 712, the first throttle component and the second throttle component are controlled to close.

At step 714, the air conditioner system operates in the normal logic.

The control method as shown in FIG. 7 is further described below in combination with FIG. 1. When it is detected that the capability requirement of the indoor unit is less than or equal to a % for b minutes, the air conditioner system is determined to be the small-load heating operation. At this time, the auxiliary operation heat exchanger 5, the first throttle component 6 and the second throttle component 7 are turned on, the first port and the fourth port of the second four-way valve 22 are controlled to in communication (for example, the second four-way valve 22 is controlled to be powered on so that its first port is in communication with its fourth port), and the first throttle component 6 and the second throttle component 7 are adjusted according to a certain logic. After the above control is performed, the high-temperature and high-pressure gaseous refrigerant from the first four-way valve 21 is divided into two branches, the refrigerant of one branch directly enters the indoor heat exchanger 4 to condense and release heat, and the refrigerant of another branch enters into the auxiliary heat exchanger 5 after passing through the second four-way valve 22 and exchanges heat with a refrigerant in a low temperature and low pressure state after being throttled by the second throttle component 7. When it is detected that the capacity requirement of the indoor unit is larger than or equal to c % for d minutes, it is determined that the air conditioner system is operated in a non-small-load state. At this time, the first throttle component 6 and the second throttle component 7 are controlled to close (of course, the second four-way valve 22 may be controlled to be powered down or may not be controlled) to exit the small-load control logic. It can be seen that the auxiliary heat exchanger 5 can adjust the load capacity of the air conditioner system to ensure that the compressor 1 can be in an optimal lubrication state.

Furthermore, the second four-way valve, the first throttle component and the second throttle component are required in both the control logic shown in FIG. 5 and the control logic shown in FIG. 7. Therefore, when both of the control condition in FIG. 5 and the control condition in FIG. 7 are satisfied, it is necessary to set a control priority. In a preferred embodiment of the present disclosure, the control priority shown in FIG. 7 is higher than the control priority shown in FIG. 5. That is, when both of the control condition in FIG. 5 and the control condition in FIG. 7 are satisfied, the control logic shown in FIG. 7 is executed.

Figure 8:
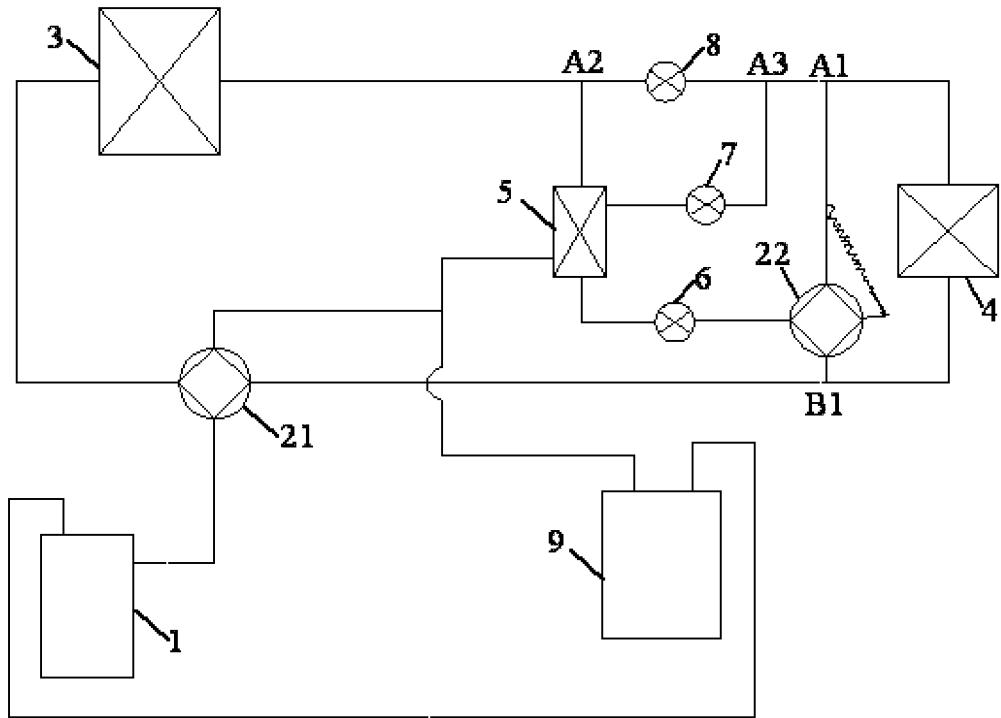
FIG. 8 is a schematic view showing the structure of an air conditioner system according to a fourth embodiment of the present disclosure.

FIG. 8 is a schematic diagram showing the structure of an air conditioner system according to a fourth embodiment of the present disclosure.

As shown in FIG. 8, an air conditioner system according to the fourth embodiment of the present disclosure includes: a refrigeration system comprising at least a compressor 1, a first four-way valve 21, an outdoor heat exchanger 3, and an indoor heat exchanger 4, a second four-way valve 22, the auxiliary heat exchanger 5, a first throttle component 6, and a second throttle component 7.

The first port of the second four-way valve 22 is connected to a pipeline between the first four-way valve 21 and the indoor heat exchanger 4 (the position of B1 in FIG. 8), and a second port of the second four-way valve 22 is connected to a first position (the position of A1 in FIG. 8) in a pipeline between the indoor heat exchanger 4 and the outdoor heat exchanger 3. The auxiliary heat exchanger 5 has a first passage and a second passage. A first port of the first passage of the auxiliary heat exchanger 5 is in communication with a fourth port of the second four-way valve 22, and a second port of the first passage of the auxiliary heat exchanger 5 is connected to a second position (the position of A2 in FIG. 8) in the pipeline between the indoor heat exchanger 4 and the outdoor heat exchanger 3. A first port of the second passage of the auxiliary heat exchanger 5 is connected to a third position (the position of A3 in FIG. 8) in the pipeline between the indoor heat exchanger 4 and the outdoor heat exchanger 3, and a second port of the second passage of the auxiliary heat exchanger 5 is connected to any position in the pipeline between the outdoor heat exchanger 3 and an return-air inlet of the compressor 1. The first throttle component 6 is disposed in a pipeline between the first port of the first passage of the auxiliary heat exchanger 5 and the fourth port of the second four-way valve 22, and the second throttle component 7 is disposed in a pipeline between the first port of the second passage of the auxiliary heat exchanger 5 and the third position.

Further, the refrigeration system further includes a third throttle component 8 and a gas-liquid separator 9. Four ports of the first four-way valve 21 are in communication with an exhaust outlet of the compressor 1, a first port of the outdoor heat exchanger 3, a first port of the indoor heat exchanger 4, and an inlet of the gas-liquid separator 9 respectively, the second port of the outdoor heat exchanger 3 is connected to a second port of the indoor heat exchanger 4 through the third throttle component 8, and an outlet of the gas-liquid separator 9 is in communication with the return-air inlet of the compressor 1.

Further, the specific connection position of the second port of the second passage of the auxiliary heat exchanger 5 may be as follows:

1. As shown in FIG. 8, the second port of the second passage of the auxiliary heat exchanger 5 is connected to a pipe in which the inlet of the gas-liquid separator 9 is in communication with the first four-way valve 21.

2. Similarly to the structure shown in FIG. 2, the second port of the second passage of the auxiliary heat exchanger 5 is connected to a pipe in which the first port of the outdoor heat exchanger 3 is in communication with the first four-way valve 21.

3. The second port of the second passage of the auxiliary heat exchanger 5 is connected to a pipe in which the outlet of the gas-liquid separator 9 is in communication with the return-air inlet of the compressor 1.

4. Similarly to the structure shown in FIG. 3, the second port of the second passage of the auxiliary heat exchanger 5 is connected to the first port of the third four-way valve 23, the second port of the third four-way valve 23 is connected to a pipe in which the first port of the outdoor heat exchanger 3 is in communication with the first four-way valve 21, and the fourth port of the third four-way valve 23 is connected to a pipe in which the inlet of the gas-liquid separator 9 is in communication with the first four-way valve 21. Thus, it is possible to control whether the refrigerant passing through the second passage of the auxiliary heat exchanger 5 enters the gas-liquid separator 9 directly or after passing through the first four-way valve 21, by controlling the energization and de-energization of the third four-way valve 23.

In addition, the air conditioner system further includes: a controller (not shown in FIG. 8) connected to the first throttle component 6, the second throttle component 7, and the second four-way valve 22, being configured to control the first throttle component 6, the second throttle component 7, and the second four-way valve 22.

In one embodiment of the present disclosure, the controller is configured to: control the first throttle component 6 and the second throttle component 7 to open, and control the second port and the fourth port of the second four-way valve 22 to be communicated, if the air conditioner system is cooling under the small-load operation state.

In the embodiment, when the air conditioner system is cooling under the small-load operation state, the first throttle component 6 and the second throttle component 7 are controlled to open, and the second port and the fourth port of the second four-way valve 22b are controlled to be in communication, such that the refrigerant after passing through the outdoor heat exchanger 3 is divided into two branches, the refrigerant of one branch enters into the second passage of the auxiliary heat exchanger 5 after passing through the outdoor heat exchanger 3 and being throttled by the second throttling component 7, the refrigerant of another branch can directly enter the first passage of the auxiliary heat exchanger 5 and enter the indoor heat exchanger 4 through the second four-way valve 22, and the refrigerants of the two branches in the auxiliary heat exchanger 5 exchange heat. That is, the refrigerant in the second passage is throttled by the second throttle component 7 and thus evaporates in the auxiliary heat exchanger 5, and the refrigerant in the first passage is condensed. This can increase the evaporation pressure and the evaporation temperature of the air conditioner system, and avoid the damage to the compressor 1 due to oil shortage caused by the air conditioner system being in the small-load cooling operation.

Figure 9:
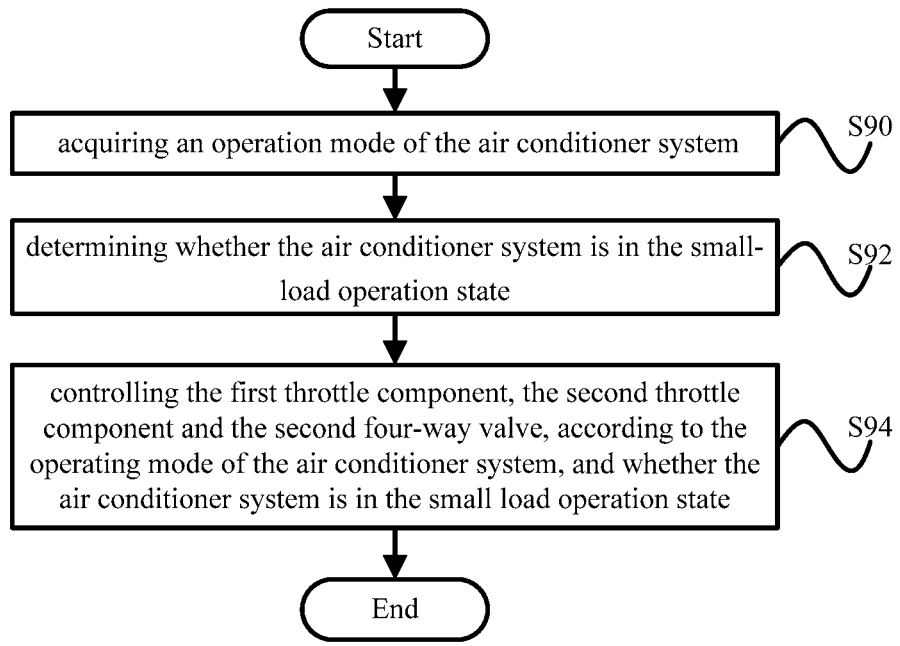
FIG. 9 is a flow chart showing a control method of an air conditioner system according to a fourth embodiment of the present disclosure.

Based on the structure of the air conditioner system as shown in FIG. 8, the controlling method proposed by the present disclosure includes, as shown in FIG. 9.

At step 90, an operation mode of the air conditioner system is acquired.

At step 92 whether the air conditioner system is in the small-load operation state is determined.

In one embodiment of the present disclosure, the step of determining whether the air conditioner system is in a small-load operation state in step S92 comprises: determining whether a sum of capability requirements of all of operating indoor units in the air conditioner system is less than or equal to a second value for a fourth predetermined duration; determining that the air conditioner system is in the small-load operation state when the sum of the capability requirements of all of operating indoor units is less than or equal to the second value for the fourth predetermined duration.

In another embodiment of the present disclosure, whether the air conditioner system is in the small-load operation state may be determined according to the number of the indoor units in the operation state, for example, when the number of indoor units in the operation state is smaller, the air conditioner system may be determined to be in the small-load operation state.

Step S94: according to the operating mode of the air conditioner system, and whether the air conditioner system is in the small-load operation state, the first throttle component, the second throttle component and the second four-way valve are controlled.

In an embodiment of the present disclosure, step S94 is specifically: controlling the first throttle component and the second throttle component to open, and controlling the second port and the fourth port of the two-way valve to be communicated, when the air conditioner system is cooling, and the air conditioner system is determined to be in the small-load operation state.

In the embodiment, when the first throttle component is disposed on the pipeline between the first port of the first passage and the fourth port of the second four-way valve, if the air conditioner system is cooling under the small-load operation state, the first throttle component and the second throttle component can be controlled to open, and the second port and the fourth port of the second four-way valve can be controlled to be communicated, such that the refrigerant after passing through the outdoor heat exchanger is divided into two branches, the refrigerant of one branch enters the second passage of the auxiliary heat exchanger after passing through the outdoor heat exchanger and being throttled by the second throttling component, the refrigerant of another branch can directly enter the first passage of the auxiliary heat exchanger and enter the indoor heat exchanger through the second four-way valve, and the refrigerants of the two branches in the auxiliary heat exchanger exchange heat. That is, the refrigerant in the second passage is throttled by the second throttle component and thus evaporates in the auxiliary heat exchanger, and the refrigerant in the first passage is condensed. Thus, this can increase the evaporation pressure and the evaporation temperature of the air conditioner system, and avoid and damage to the compressor due to oil shortage caused by the air conditioner system being the small-load cooling operation.

In one embodiment of the present disclosure, after controlling the first throttle component and the second throttle component to open, the following steps are further comprised: determining whether the air conditioner system exits the small-load operation state; and when the system exits the small-load operating state, controlling the first throttle component and the second throttle component to close.

In this embodiment, when it is determined that the air conditioner system exits the small-load operation state, the first throttle component and the second throttle component are controlled to close, so that the air conditioner system can operate in a normal operation mode.

In one embodiment of the present disclosure, the step of determining whether the air conditioner system exits the small-load operation state includes: determining whether a sum of capability requirements of all of operating indoor units in the air conditioner system is larger than or equal to a first value for a third predetermined duration; and determining that the air conditioner system exits the small-load operation state when the sum of the capability requirements of all of the operating indoor units is larger than or equal to the first value for the third predetermined duration.

In another embodiment of the present disclosure, whether the air conditioner system exits the small-load operation state may be determined according to the number of the indoor units in the operation state. For example, when the number of the indoor units in the operation state is larger, it may be determined that the air conditioner system exits the small-load operation state.

According to an embodiment of the present disclosure, the step of determining whether the air conditioner system is in the small-load operation state comprises: determining whether the sum of capability requirements of all of operating indoor units in the air conditioner system is less than or equal to a second value for a fourth predetermined duration; and determining that the air conditioner system is in the small-load operating state, when the sum of capability requirements of all of the operating indoor units is less than or equal to the second value for the fourth predetermined duration.

In another embodiment of the present disclosure, whether the air conditioner system is in the small-load operation state may be determined according to the number of indoor units in the operation state. For example, when the number of indoor units in the operation state is small, the air conditioner system may be determined to be in the small-load operation state.

Further, after controlling the first throttle component and the second throttle component to open, the following step is further included: detecting temperature values of a second port and a first port of the second passage of the auxiliary heat exchanger; and adjusting an opening degree of the second throttle component according to the temperature values of the second port and the first port of the second passage of the auxiliary heat exchanger.

In this embodiment, since the second passage of the auxiliary heat exchanger is mainly for the evaporation of the refrigerant, and the temperature values of the second port and the first port of the second passage of the auxiliary heat exchanger reflect the superheat degree of the evaporation side of the auxiliary heat exchanger, by adjusting the opening degree of the second throttle component according to the temperature values of the second port and the first port of the second passage of the auxiliary heat exchanger, it can be ensured that the amount of refrigerant flowing through the second passage is in the reasonable range.

In addition, the step of adjusting the opening degree of the second throttle component according to the temperature values of the second port and the first port of the second passage of the auxiliary heat exchanger comprises: calculating a temperature difference between the second port and the first port of the second passage;

reducing the opening degree of the second throttle component to a first opening degree, during the process in which the temperature difference rises to a first temperature value, and the process in which the temperature difference decrease from a second temperature value; and controlling the opening degree of the second throttle component to remain unchanged, during the process in which the temperature difference increase from the first temperature value to the third temperature value, and in the process in which the temperature difference decrease from the fourth temperature value to the second temperature value; and increasing the opening degree of the second throttle component to a second opening degree, during the process in which the temperature difference continues to rise from the third temperature value, and during the process in which the temperature difference drops to the fourth temperature value.

In this embodiment, during the rising process, the temperature difference between the second port and the first port of the second passage of the auxiliary heat exchanger is divided into three sections, that is, the first temperature value or less, the first temperature value to the third temperature value, and the third temperature value or more; during the falling process, the temperature difference between the second port and the first port of the second passage of the auxiliary heat exchanger is divided into three sections s, that is, decreasing to the fourth temperature value, the fourth temperature value to the second temperature value, and the second temperature value or less. The larger the temperature difference between the second port and the first port of the second passage of the auxiliary heat exchanger is, the more the refrigerant in the second passage is required. Therefore, the opening degree of the second throttle component can be appropriately increased. Conversely, if the temperature difference between the second port and the first port of the second passage of the auxiliary heat exchanger is smaller, the less amount of refrigerant in the second passage is required. Thus, the opening degree of the second throttle component can be appropriately reduced.

Further, after controlling the first throttle component and the second throttle component to open, the following step is further comprised: detecting a temperature of the outdoor heat exchanger in the air conditioner system, and detecting a tube temperature of the first passage of the auxiliary heat exchanger; calculating an average of the temperature of the outdoor heat exchanger and the tube temperature of the first passage of the auxiliary heat exchanger; and adjusting the opening degree of the first throttle component according to the tube temperature of the first passage of the auxiliary heat exchanger and the average.

In this embodiment, the average of the temperature of the outdoor heat exchanger in the air conditioner system and the tube temperature of the first passage of the auxiliary heat exchanger is calculated, and the opening degree of the first throttle component is adjusted according to the tube temperature of the first passage of the auxiliary heat exchanger and the calculated average, so that the tube temperature of the first passage of the auxiliary heat exchanger can be indirectly controlled by adjusting the opening degree of the first throttle component. Thus, it is ensured that the tube temperature of the first passage of the auxiliary heat exchanger is adapted to the average of temperatures of all of the condenser in the air conditioner system (when the air conditioner system is in the cooling operation, the first passage of the auxiliary heat exchanger and the outdoor heat exchanger are used as condensers.), and the tube temperature of the first passage of the auxiliary heat exchanger is prevented from being too low or too high.

Further, the step of adjusting the opening degree of the first throttle component according to the tube temperature of the first passage of the auxiliary heat exchanger and the average comprises: increasing the opening degree of the first throttle component, when the tube temperature of the first passage of the auxiliary heat exchanger is lower than the difference between the average and the first predetermined value; controlling the opening degree of the first throttle component to remain unchanged, when the tube temperature of the first passage of the auxiliary heat exchanger is higher than or equal to the difference between the average and the first predetermined value, and lower than or equal to the sum of the average and the second predetermined value; and reducing the opening degree of the first throttle component, when the tube temperature of the first passage of the auxiliary heat exchanger is higher than the sum of the average and the second predetermined value.

In this embodiment, when the tube temperature of the first passage of the auxiliary heat exchanger is lower than the difference between the average and the first predetermined value, it indicates that the tube temperature of the first passage of the auxiliary heat exchanger is lower, that is, the amount of refrigerant is less. Thus, the opening degree of the first throttle component can be increased. Conversely, when the tube temperature of the first passage of the auxiliary heat exchanger is higher than the sum of the above average and the second predetermined value, it indicates that tube temperature of the first passage of the auxiliary heat exchanger is higher, that is, the amount of refrigerant is more. Thus, the opening degree of the first throttle component can be reduced. When the tube temperature of the first passage of the auxiliary heat exchanger is higher than or equal to the difference between the above average and the first predetermined value, and lower than or equal to the sum of the above average and the second predetermined value, it indicates that the tube temperature of the first passage of the auxiliary heat exchanger is within a normal range. Therefore, the opening degree of the first throttle component can be controlled to remain unchanged.

Further, the present disclosure is directed to the structure of the above air conditioner system, and corresponding control devices are also proposed respectively.

Figure 10:
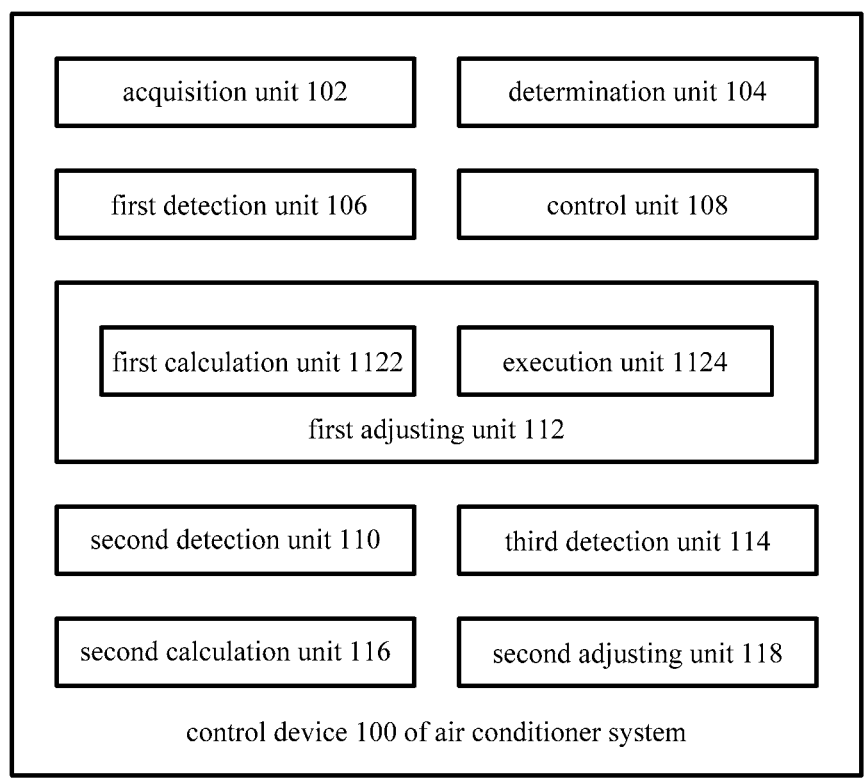
FIG. 10 is a schematic block diagram showing a control device of an air conditioner system according to a first embodiment of the present disclosure.

Specifically, based on the structure of the air conditioner system shown in any one of FIG. 1 to FIG. 3, as shown in FIG. 10, the control device 100 of the air conditioner system according to the first embodiment of the present disclosure includes: an acquisition unit 102, a determination unit 104 or a first detection unit 106, the control unit 108.

The acquisition unit 102 is configured to acquire an operating mode of the air conditioner system. The determination unit 104 is configured to determine whether the air conditioner system is in a small-load operation state. The first detecting unit 106 is configured to detect an outdoor ambient temperature and the exhaust superheat degree of the compressor. The control unit 108 is configured to control the first throttle component, the second throttle component, and the second four-way valve, according to an operation mode of the air conditioner system, and the outdoor ambient temperature and the exhaust superheat degree detected by the first detecting unit or whether the air conditioner system is in a small-load operating state.

The control operation of the control unit 108 has the following two embodiments:

A First Embodiment

In an embodiment of the present disclosure, the control unit 108 is configured to control the first throttle component and the second throttle component to open, and control the second port and the fourth port of the second four-way valve to be communicated, if the air conditioner system is in the heating operation, and the first detecting unit 106 detects that the outdoor ambient temperature is lower than or equal to a first set temperature value, and the exhaust superheat degree of the compressor is less than or equal to a first set superheat degree for a first predetermined duration.

In this embodiment, when the air conditioner system is in the heating operation, the outdoor ambient temperature is lower than or equal to the first set-temperature value, and the exhaust superheat degree of the compressor is less than or equal to the first set superheat degree for the first predetermined duration, the first throttle component and the second throttle component are controlled to open, and the second port and the fourth port of the second four-way valve are controlled to be communicated, such that the refrigerant after passing through the indoor heat exchanger is divided into two branches, and the refrigerant of one branch enters the second passage of the auxiliary heat exchanger after passing through the indoor heat exchanger and being throttled by the second throttle component, the refrigerant of another branch can directly enter the first passage of the auxiliary heat exchanger through the second four-way valve, and the refrigerants of the two branches exchange heat. That is, the refrigerant in the second passage is throttled by the second throttle component, and thus evaporates in the auxiliary heat exchanger, and the refrigerant in the first passage is condensed, which can increase the evaporation pressure and the evaporation temperature of the air conditioner system, and effectively utilize the heat of the condensed refrigerant. This improves the overall heat exchange amount of the air conditioner system and enhances the low temperature heating capacity of the air conditioner system.

Further, the control unit 108 is further configured to control the first throttle component and the second throttle component to close, if the first detection unit 106 detects that the exhaust superheat degree of the compressor is larger than or equal to a second set superheat degree for a second predetermined duration, or that the outdoor ambient temperature is higher than or equal to a second set temperature value, after the first throttle component and the second throttle component are controlled to open.

In this embodiment, when it is detected that the exhaust superheat degree of the compressor is larger than or equal to the second set superheat degree for the second predetermined duration, or that the outdoor ambient temperature is higher than or equal to the second set temperature value, it indicates that the air conditioner system is not in the low-temperature heating operation. In this case, the first throttle component and the second throttle component can be controlled to close such that the air conditioner system operates in a normal manner.

A Second Embodiment

In an embodiment of the present disclosure, the control unit 108 is configured to: control the first throttle component and the second throttle component to open, and control the first port and the fourth port of the second four-way valve to be in communication, if the air conditioner system is in the heating operation, and the determination unit 104 determines that the air conditioner system is in the small-load operation state.

In this embodiment, if the air conditioner system is in the heating operation and is in the small-load operation state, the first throttle component and the second throttle component are controlled to open, and the first port and the fourth port of the second four-way valve are controlled to be in communication, so that the refrigerant after passing through the first four-way valve is divided into two branches, the refrigerant of one branch enters the second passage of the auxiliary heat exchanger after passing through the indoor heat exchanger and being throttled by the second throttling component, the refrigerant of another branch can directly enter the first passage of the auxiliary heat exchanger through the second four-way valve, and the refrigerants of the two branches exchange heat. That is, the refrigerant in the second passage is throttled by the second throttle component, and thus evaporates in the auxiliary heat exchanger, and the refrigerant in the first passage is condensed, which can increase the evaporation pressure and the evaporation temperature of the air conditioner system, and avoid the damage to the compressor due to oil shortage caused by the air conditioner system being in the small-load heating operation. Also, this can also be improve the overall heat exchange amount of the air conditioner unit, and enhance the low temperature heating capacity of the air conditioner system.

Further, the determination unit 104 is further configured to determine whether the air conditioner system exits the small-load operation state after the control unit 108 controls the first throttle component and the second throttle component to open. The control unit 108 is further configured to control the first throttle component and the second throttle component to close when the air conditioner system exits the small-load operation state.

In this embodiment, when it is determined that the air conditioner system exits the small-load operation state, the first throttle component and the second throttle component are controlled to close, so that the air conditioner system can operate in a normal operation mode.

Further, the determination unit 104 is configured to: determine whether a sum of capability requirements of all of operating indoor units in the air conditioner system is larger than or equal to a first value for a third predetermined duration; and determine that the air conditioner system exits the small-load operation state, when the sum of the capability requirements of all of the operating indoor units is larger than or equal to the first value for the third predetermined duration.

In another embodiment of the present disclosure, whether the air conditioner system exits the small-load operation state may be determined according to the number of the indoor units in the operation state. For example, when the number of the indoor units in the operation state is larger, it may be determined that the air conditioner system exits the small-load operation state.

Further, the determination unit 104 is further configured to: determine whether the sum of capability requirements of all of the operating indoor units in the air conditioner system is less than or equal to a second value for a fourth predetermined duration; and determine that the air conditioner system is in the small-load operation state, when the sum of capability requirements of all of the operating indoor units is less than or equal to the second value for the fourth predetermined duration.

In another embodiment of the present disclosure, whether the air conditioner system is in the small-load operation state may be also determined according to the number of indoor units in the operation state. For example, when the number of indoor units in the operation state is smaller, the air conditioner system may be determined to be in the small-load operation state.

On basis of any of the above two embodiments, the control device 100 of the air conditioner system further includes a second detecting unit 110 and a first adjusting unit 112.

The second detection unit 110 is configured to detect temperature values of a second port and a first port of the second passage of the auxiliary heat exchanger, after the control unit 108 controls the first throttle component and the second throttle component to open. The first adjusting unit 112 is configured to adjust an opening degree of the second throttle component according to the temperature values of the second port and the first port of the second passage of the auxiliary heat exchanger.

In this embodiment, since the second passage of the auxiliary heat exchanger is mainly for the evaporation of the refrigerant, and the temperature values of the second port and the first port of the second passage of the auxiliary heat exchanger reflect the superheat degree of the evaporation side of the auxiliary heat exchanger, by adjusting the opening degree of the second throttle component according to the temperature values of the second port and the first port of the second passage of the auxiliary heat exchanger, it is ensured that the amount of refrigerant flowing through the second passage is in the reasonable range.

According to an embodiment of the present disclosure, the first adjusting unit 112 comprises a first calculation unit 1122 and an execution unit 1124.

The first calculation unit 1122 is configured to calculate a temperature difference between the second port and the first port of the second passage.

The execution unit 1124 is configured to reduce the opening degree of the second throttle component to a first opening degree, during the process in which the temperature difference rises to a first temperature value, and the process in which the temperature difference decreases from a second temperature value; control the opening degree of the second throttle component to remain unchanged, during the process in which the temperature difference increases from the first temperature value to the third temperature value, and in the process in which the temperature difference decreases from the fourth temperature value to the second temperature value; and increase the opening degree of the second throttle component to a second opening degree, during the process in which the temperature difference continues to rise from the third temperature value, and during the process in which the temperature difference drops to the fourth temperature value.

In this embodiment, during the rising process, the temperature difference between the second port and the first port of the second passage of the auxiliary heat exchanger is divided into three sections, that is, the first temperature value or less, the first temperature value to the third temperature value, and the third temperature value or more; during the falling process, the temperature difference between the second port and the first port of the second passage of the auxiliary heat exchanger is divided into three sections, that is, decreasing to the fourth temperature value, the fourth temperature value to the second temperature value, and the second temperature value or less. The higher the temperature difference between the second port and the first port of the second passage of the auxiliary heat exchanger is, the more the refrigerant in the second passage is required. Therefore, the opening degree of the second throttle component can be appropriately increased. Conversely, if the temperature difference between the second port and the first port of the second passage of the auxiliary heat exchanger is smaller, the less amount of refrigerant in the second passage is required. Thus, the opening degree of the second throttle component can be appropriately reduced.

According to an embodiment of the present disclosure, the control device 100 of the air conditioner system further comprises a third detection unit 114, a second calculation unit 116 and a second adjusting unit 118.

The third detection unit 114 is configured to detect a temperature of an indoor heat exchanger of an operating indoor unit in the air conditioner system, and detect a tube temperature of the first passage of the auxiliary heat exchanger. The second calculation unit 116 is configured to calculate an average of the temperature of the indoor heat exchanger of the operating indoor unit in the air conditioner system and the tube temperature of the first passage of the auxiliary heat exchanger. The second adjusting unit 118 is configured to adjust the opening degree of the first throttle component according to the tube temperature of the first passage of the auxiliary heat exchanger and the average.

In this embodiment, the average of the temperature of the heat exchanger of the operating indoor unit in the air conditioner system and the tube temperature of the first passage of the auxiliary heat exchanger is calculated, and the opening degree of the first throttle component is adjusted according to the tube temperature of the first passage of the auxiliary heat exchanger and the calculated average, so that the tube temperature of the first passage of the auxiliary heat exchanger can be indirectly controlled by adjusting the opening degree of the first throttle component. Further, it is ensured that the tube temperature of the first passage of the auxiliary heat exchanger is adapted to the average of temperatures of all of the condenser in the air conditioner system (When the air conditioner system is in the heating operation, the first passage of the auxiliary heat exchanger and the indoor heat exchanger of the operating indoor unit are used as condensers), and the tube temperature of the first passage of the auxiliary heat exchanger is prevented from being too low or too high.

According to an embodiment of the present disclosure, the second adjusting unit 118 is configured to: increase the opening degree of the first throttle component, when the tube temperature of the first passage of the auxiliary heat exchanger is lower than the difference between the average and the first predetermined value; control the opening degree of the first throttle component to remain unchanged, when the tube temperature of the first passage of the auxiliary heat exchanger is higher than or equal to the difference between the average and the first predetermined value, and lower than or equal to the sum of the average and the second predetermined value; reduce the opening degree of the first throttle component, when the tube temperature of the first passage of the auxiliary heat exchanger is higher than the sum of the average and the second predetermined value.

In this embodiment, when the tube temperature of the first passage of the auxiliary heat exchanger is lower than the difference between the average and the first predetermined value, it indicates that the tube temperature of the first passage of the auxiliary heat exchanger is lower, that is, the amount of refrigerant is less. Thus, the opening degree of the first throttle component can be increased. Conversely, when the tube temperature of the first passage of the auxiliary heat exchanger is higher than the sum of the above average and the second predetermined value, it indicates that tube temperature of the first passage of the auxiliary heat exchanger is higher, that is, the amount of refrigerant is more. Thus, the opening degree of the first throttle component can be reduced. When the tube temperature of the first passage of the auxiliary heat exchanger is higher than or equal to the difference between the above average and the first predetermined value, and lower than or equal to the sum of the above average and the second predetermined value, it indicates that the tube temperature of the first passage of the auxiliary heat exchanger is within a normal range. Therefore, the opening degree of the first throttle component can be controlled to remain unchanged.

Figure 11:
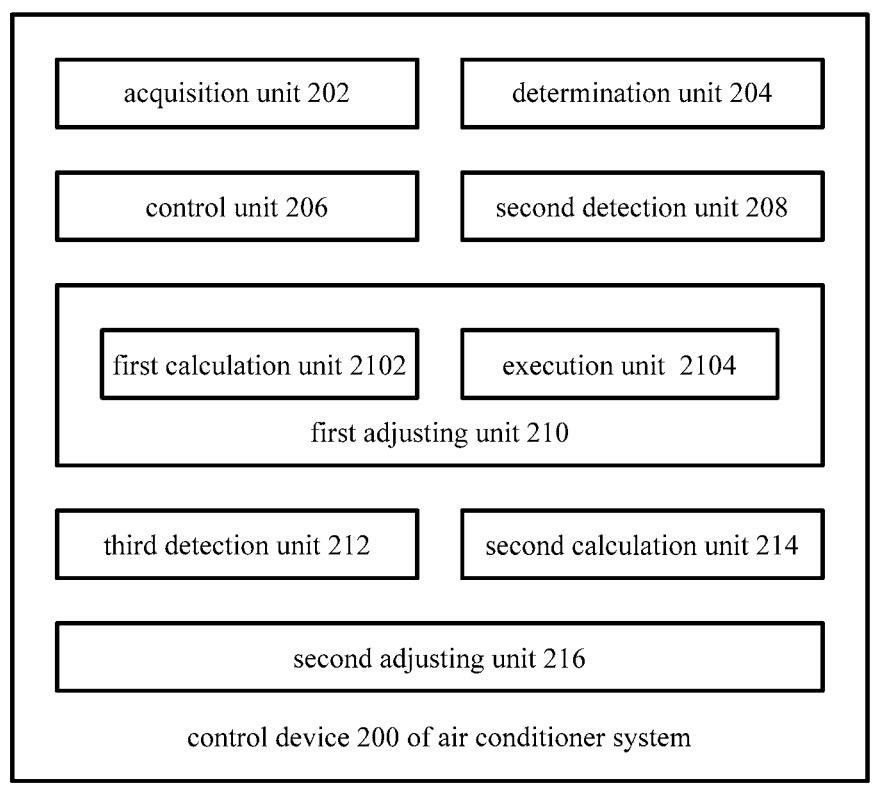
FIG. 11 is a schematic block diagram showing a control device of an air conditioner system according to a second embodiment of the present disclosure.

Specifically, based on the structure of the air conditioner system shown in FIG. 8, as shown in FIG. 11, the control device 200 of the air conditioner system according to the second embodiment of the present disclosure includes: an acquisition unit 202, a determination unit 204 and a control unit 206.

The acquisition unit 202 is configured to acquire an operating mode of the air conditioner system. The determination unit 204 is configured to determine whether the air conditioner system is in a small-load operation state. The control unit 206 is configured to control the first throttle component, the second throttle component, and the second four-way valve, according to an operation mode of the air conditioner system, and whether the air conditioner system is in a small-load operation state.

The control unit 206 is configured to control the first throttle component and the second throttle component to open, and control the second port and the fourth port of the second four-way valve to be communicated, if the air conditioner system is in the cooling operation, and the determination unit 204 determines that the air conditioner system is in the small-load operation state.

In this embodiment, when the first throttle component is disposed in the pipeline between the first port of the first passage and the fourth port of the second four-way valve, if the air conditioner system is cooling under a small-load operation state, the first throttle component and the second throttle component are controlled to open, and the second port and the fourth port of the second four-way valve are controlled to be communicated, such that the refrigerant after passing through the outdoor heat exchanger is divided into two branches, the refrigerant of one branch enters the second passage of the auxiliary heat exchanger after passing through the outdoor heat exchanger and being throttled by the second throttle component, the refrigerant of another branch can directly enter the first passage of the auxiliary heat exchanger and enters the indoor heat exchanger through the second four-way valve, and the refrigerants of the two branches exchange heat. That is, the refrigerant in the second passage is throttled by the second throttle component, and thus evaporates in the auxiliary heat exchanger, and the refrigerant in the first passage is condensed, which can increases the evaporation pressure and the evaporation temperature of the air conditioner system, and avoid the damage to the compressor due to oil shortage caused when the air conditioner system is in the small-load cooling operation.

Further, the determination unit 204 is further configured to determine whether the air conditioner system exits the small-load operation state after the control unit 206 controls the first throttle component and the second throttle component to open. The control unit 206 is further configured to control the first throttle component and the second throttle component to close when the air conditioner system exits the small-load operation state.

In this embodiment, when it is determined that the air conditioner system exits the small-load operation state, the first throttle component and the second throttle component are controlled to close, so that the air conditioner system can operate in a normal operation mode.

Further, the determination unit 204 is configured to: determine whether a sum of capability requirements of all of operating indoor units in the air conditioner system is larger than or equal to a first value for a third predetermined duration; and determine that the air conditioner system exits the small-load operation state, when the sum of the capability requirements of all of the operating indoor units is larger than or equal to the first value for the third predetermined duration.

In another embodiment of the present disclosure, whether the air conditioner system exits the small-load operation state may be determined according to the number of the indoor units in the operation state. For example, when the number of the indoor units in the operation state is larger, it may be determined that the air conditioner system exits the small-load operation state.

Further, the determination unit 204 is further configured to: determine whether the sum of capability requirements of all of the operating indoor units in the air conditioner system is less than or equal to a second value for a fourth predetermined duration; and determine that the air conditioner system is in the small-load operation state, when the sum of capability requirements of all of the operating indoor units is less than or equal to the second value for the fourth predetermined duration.

In another embodiment of the present disclosure, whether the air conditioner system is in the small-load operation state may be also determined according to the number of indoor units in the operation state. For example, when the number of indoor units in the operation state is smaller, the air conditioner system may be determined to be in the small-load operation state.

Further, the control device 200 of the air conditioner system further includes a second detection unit 208 and a first adjusting unit 210.

The second detection unit 208 is configured to detect temperature values of a second port and a first port of the second passage of the auxiliary heat exchanger, after the control unit 206 controls the first throttle component and the second throttle component to open. The first adjusting unit 210 is configured to adjust an opening degree of the second throttle component according to the temperature values of the second port and the first port of the second passage of the auxiliary heat exchanger.

In this embodiment, since the second passage of the auxiliary heat exchanger is mainly for the evaporation of the refrigerant, and the temperature values of the second port and the first port of the second passage of the auxiliary heat exchanger reflect the superheat degree of the evaporation side of the auxiliary heat exchanger, by adjusting the opening degree of the second throttle component according to the temperature values of the second port and the first port of the second passage of the auxiliary heat exchanger, it can be ensured that the amount of refrigerant flowing through the second passage is in the reasonable range.

Further, the first adjusting unit 210 comprises a first calculation unit 2102 and an execution unit 2104.

The first calculation unit 2102 calculates a temperature difference between the second port and the first port of the second passage.

The execution unit 2104 is configured to reduce the opening degree of the second throttle component to a first opening degree, during the process in which the temperature difference rises to a first temperature value, and the process in which the temperature difference decreases from a second temperature value; control the opening degree of the second throttle component to remain unchanged, during the process in which the temperature difference increases from the first temperature value to the third temperature value, and in the process in which the temperature difference decreases from the fourth temperature value to the second temperature value; and increase the opening degree of the second throttle component to a second opening degree, during the process in which the temperature difference continues to rise from the third temperature value, and during the process in which the temperature difference drops to the fourth temperature value.

In this embodiment, during the rising process, the temperature difference between the second port and the first port of the second passage of the auxiliary heat exchanger is divided into three sections, that is, the first temperature value or less, the first temperature value to the third temperature value, and the third temperature value or more; during the falling process, the temperature difference between the second port and the first port of the second passage of the auxiliary heat exchanger is divided into three sections, that is, decreasing to the fourth temperature value, the fourth temperature value to the second temperature value, and the second temperature value or less. The higher the temperature difference between the second port and the first port of the second passage of the auxiliary heat exchanger is, the more the refrigerant in the second passage is required. Therefore, the opening degree of the second throttle component can be appropriately increased. Conversely, if the temperature difference between the second port and the first port of the second passage of the auxiliary heat exchanger is smaller, the less amount of refrigerant in the second passage is required. Thus, the opening degree of the second throttle component can be appropriately reduced.

Further, the control device 200 of the air conditioner system further comprises: a third detection unit 212 configured to detect a temperature of the outdoor heat exchanger in the air conditioner system after the control unit 206 controls the first throttle component and the second throttle component to open, and detect the a tube temperature of the first passage of the auxiliary heat exchanger; a second calculation unit 214 configured to calculate an average of the temperature of the outdoor heat exchanger and the tube temperature of the first passage of the auxiliary heat exchanger; and an adjusting unit 216 being configured to adjust an opening degree of the first throttle component according to the tube temperature of the first passage of the auxiliary heat exchanger and the average.

In this embodiment, the average of the temperature of the outdoor heat exchanger in the air conditioner system and the tube temperature of the first passage of the auxiliary heat exchanger is calculated, and the opening degree of the first throttle component is adjusted according to the tube temperature of the first passage of the auxiliary heat exchanger and the calculated average, so that the tube temperature of the first passage of the auxiliary heat exchanger can be indirectly controlled by adjusting the opening degree of the first throttle component. Thus, it is ensured that the tube temperature of the first passage of the auxiliary heat exchanger is adapted to the average of temperatures of all of the condenser in the air conditioner system (When the air conditioner system is in the cooling operation, the first passage of the auxiliary heat exchanger and the outdoor heat exchanger are used as condensers), and the tube temperature of the first passage of the auxiliary heat exchanger is prevented from being too low or too high.

According to an embodiment of the present disclosure, the second adjusting unit 216 is configured to: increase the opening degree of the first throttle component, when the tube temperature of the first passage of the auxiliary heat exchanger is less than the difference between the average and the first predetermined value; control the opening degree of the first throttle component to remain unchanged, when the tube temperature of the first passage of the auxiliary heat exchanger is higher than or equal to the difference between the average and the first predetermined value, and lower than or equal to the sum of the average and the second predetermined value; reduce the opening degree of the first throttle component, when the tube temperature of the first passage of the auxiliary heat exchanger is higher than the sum of the average and the second predetermined value.

In this embodiment, when the tube temperature of the first passage of the auxiliary heat exchanger is lower than the difference between the average and the first predetermined value, it indicates that the tube temperature of the first passage of the auxiliary heat exchanger is lower, that is, the amount of refrigerant is less. Thus, the opening degree of the first throttle component can be increased. Conversely, when the tube temperature of the first passage of the auxiliary heat exchanger is higher than the sum of the above average and the second predetermined value, it indicates that tube temperature of the first passage of the auxiliary heat exchanger is higher, that is, the amount of refrigerant is more. Thus, the opening degree of the first throttle component can be reduced. When the tube temperature of the first passage of the auxiliary heat exchanger is higher than or equal to the difference between the above average and the first predetermined value, and lower than or equal to the sum of the above average and the second predetermined value, it indicates that the tube temperature of the first passage of the auxiliary heat exchanger is within a normal range. Therefore, the opening degree of the first throttle component can be controlled to remain unchanged.

The above air conditioner system of the present disclosure may be a multi-split air conditioner system or an ordinary household air conditioner.

Embodiments of the present disclosure is described in detail as above with reference to the accompanying drawings. The present disclosure provides a new air conditioner system and a control method thereof, which effectively avoids the problem that the compressor is damaged due to the oil shortage caused by long-time small-load operation of the air conditioner system, and also can enhance the low temperature heating capacity of the air conditioner system.

What is claimed is:

1. An air conditioner system, comprising:
a refrigeration system including at least a compressor, a first four-way valve, an outdoor heat exchanger, and an indoor heat exchanger;
a second four-way valve, a first port of which is connected to a pipeline between the first four-way valve and the indoor heat exchanger, and a second port of which is connected to a first position in a pipeline between the indoor heat exchanger and the outdoor heat exchanger;
an auxiliary heat exchanger having a first passage and a second passage, wherein a first port of the first passage is in communication with a fourth port of the second four-way valve, a second port of the first passage is connected to a second position in a pipeline between the indoor heat exchanger and the outdoor heat exchanger, a first port of the second passage is connected to a third position in the pipeline between the indoor heat exchanger and the outdoor heat exchanger, and a second port of the second passage is connected to any position in a pipeline between the outdoor heat exchanger and a return-air inlet of the compressor;
a first throttle component disposed in a pipeline between the second port of the first passage and the second position, or in a pipeline disposed between the first port of the first passage and the fourth port of the second four-way valve; and
a second throttle component disposed on a pipeline between the first port of the second passage and the third position.

2. The air conditioner system of claim 1, wherein the refrigeration system further includes a third throttle component and a gas-liquid separator; and
wherein four ports of the first four-way valve are respectively communicated with an exhaust outlet of the compressor, a first port of the outdoor heat exchanger, a first port of the indoor heat exchanger, and an inlet of the gas-liquid separator, a second port of the outdoor heat exchanger is in communication with a second port of the indoor heat exchanger through the third throttle component, and an outlet of the gas-liquid separator is in communication with the return-air inlet of the compressor;
a second port of the second passage is connected to a pipe in which the first port of the outdoor heat exchanger is in communication with the first four-way valve, a pipe in which the inlet of the gas-liquid separator is in communication with the first four-way valve or a pipe in which the outlet of the gas-liquid separator is in communication with the return-air inlet of the compressor.

3. The air conditioner system of claim 1, further comprising:
a controller connected to the first throttle component, the second throttle component, and the second four-way valve and configured to control the first throttle component, the second throttle component, and the second four-way valve.

4. The air conditioner system of claim 3, wherein, the controller is configured to:
control the first throttle component and the second throttle component to open, and control the second port and the fourth port of the second four-way valve to be communicated, if the air conditioner system is heating, and it is detected that the outdoor ambient temperature is to be lower than or equal to a first set temperature value, the exhaust superheat degree of the compressor is lower than or equal to a first set superheat degree for a first predetermined duration, when the first throttle component is disposed in the pipeline between the second port of the first passage and the second position.

5. The air conditioner system of claim 3, wherein the controller is configured to:
control the first throttle component and the second throttle component to open and control the first port and the fourth port of the second four-way valve to be communicated, if the air conditioner system is heating and the air conditioner system is in a small-load operation state, when the first throttle component is disposed in the pipeline between the second port of the first passage and the second position.

6. The air conditioner system of claim 3, wherein the controller is configured to:
control the first throttle component and the second throttle component to open and control the second port and the fourth port of the second four-way valve to be communicated, if the air conditioner system is cooling, and the air conditioner system is in a small-load operation state, in the case that the first throttle component is disposed in the pipeline between the first port of the first passage and the fourth port of the second four-way valve.

7. A control method of an air conditioner system, for controlling the air conditioner system according to claim 1, comprising:
acquiring an operation mode of the air conditioner system;
determining whether the air conditioner system is in a small-load operation state, or detecting an outdoor ambient temperature and an exhaust superheat degree of the compressor; and
controlling the first throttle component, the second throttle component and the second four-way valve, according to the operation mode of the air conditioner system, and the detected outdoor ambient temperature and the exhaust superheat degree, or whether the air conditioner system is in the small-load operation state.

8. The control method of the air conditioner system of claim 7, wherein, the step of controlling the first throttling component, the second throttling and the second four-way valve according to the operation mode of the air conditioner system, and the detected outdoor ambient temperature and the exhaust superheat degree, comprises:

in a case where the first throttle component is disposed in the pipeline between the second port of the first passage and the second position,
if the air conditioner system is heating, and it is detected that the outdoor ambient temperature is lower than or equal to the first set temperature value, the exhaust superheat degree of the compressor is less than or equal to the first set superheat degree for the first predetermined duration, controlling the first throttle component and the second throttle component to turn on, and controlling the second port and the fourth port of the second four-way valve to be communicated.

9. The control method of the air conditioner system of claim 8, wherein after controlling the first throttle component and the second throttle component to open, further including:
controlling the first throttle component and the second throttle component to turn off, when it is detected that the exhaust superheat degree of the compressor is larger than or equal to a second set superheat degree for a second predetermined duration or the outdoor ambient temperature is larger than or equal to a second set temperature value.

10. The control method of the air conditioner system of claim 8, wherein, after controlling the first throttle component and the second throttle component to open, further comprising:
detecting temperature values of a second port and a first port of the second passage of the auxiliary heat exchanger; and
adjusting an opening degree of the second throttle component according to the temperature values of the second port and the first port of the second passage of the auxiliary heat exchanger.

11. The control method of the air conditioner system of claim 8, wherein, after controlling the first throttle component and the second throttle component to open, further comprising:
detecting a temperature of a heat exchanger being currently used as a condenser in the air conditioner system, and detecting a tube temperature of the first passage of the auxiliary heat exchanger;
calculating an average of the temperature of the heat exchanger being currently used as the condenser in the air conditioner system and the tube temperature of the first passage of the auxiliary heat exchanger; and
adjusting the opening degree of the first throttle component according to the tube temperature of the first passage of the auxiliary heat exchanger and the average.

12. The control method of the air conditioner system of claim 7, wherein the step of controlling the first throttle component and the second throttle component according to the operation mode of the air conditioner system and whether the air conditioner system is in the small-load operation state include:
in a case where the first throttle component is disposed in the pipeline between the second port of the first passage and the second position,
if the air conditioner system is heating, and the air conditioner system is determined to be in the small-load operation state, controlling the first throttle component and the second throttle component to open, and controlling the first port and the fourth port of the second four-way valve to be communicated.

13. The control method of the air conditioner system of claim 7, wherein the step of controlling the first throttle component and the second throttle component according to the operation mode of the air conditioner system and whether the air conditioner system is in the small-load operation state includes:

in a case where the first throttle component is disposed in the pipeline between the first port of the first passage and the fourth port of the second four-way valve, if the air conditioner system is cooling, and the air conditioner system is determined to be in the small-load operation state, controlling the first throttle component and the second throttle component to open, and controlling the second port and the fourth port of the second four-way valve to be communicated.

14. The control method of the air conditioner system of claim 7, wherein after controlling the first throttle component and the second throttle component to open, further comprising:

determining whether the air conditioner system exits the small-load operation state; and when the system exits the small-load operating state, controlling the first throttle component and the second throttle component to close.

15. The control method of the air conditioner system of claim 14, wherein the step of determining whether the air conditioner system exits the small-load operation state comprises:

determining whether a sum of capability requirements of all of operating indoor units in the air conditioner system is larger than or equal to a first value for a third predetermined duration; and determining that the air conditioner system exits the small-load operation state when the sum of the capability requirements of all of the operating indoor units is larger than or equal to the first value for the third predetermined duration.

16. The control method of the air conditioner system of claim 15, wherein, the step of adjusting the opening degree of the second throttle component according to the temperature values of the second port and the first port of the second passage of the auxiliary heat exchanger comprises:

calculating a temperature difference between the second port and the first port of the second passage;

reducing the opening degree of the second throttle component to a first opening degree, during the process in which the temperature difference rises to a first temperature value, and the process in which the temperature difference decreases from a second temperature value; and controlling the opening degree of the second throttle component to remain unchanged, during the process in which the temperature difference increases from the first temperature value to the third temperature value, and in the process in which the temperature difference decreases from the fourth temperature value to the second temperature value; and increasing the opening degree of the second throttle component to a second opening degree, during the process in which the temperature difference continues to rise from the third temperature value, and during the process in which the temperature difference drops to the fourth temperature value.

17. The control method of the air conditioner system of claim 15, wherein the step of adjusting the opening degree of the first throttle component according to the tube temperature of the first passage of the auxiliary heat exchanger and the average comprises:

increasing the opening degree of the first throttle component, when the tube temperature of the first passage of the auxiliary heat exchanger is lower than the difference between the average and the first predetermined value;

controlling the opening degree of the first throttle component to remain unchanged, when the tube temperature of the first passage of the auxiliary heat exchanger is larger than or equal to the difference between the average and the first predetermined value, and less than or equal to the sum of the average and the second predetermined value; and reducing the opening degree of the first throttle component, when the tube temperature of the first passage of the auxiliary heat exchanger is larger than the sum of the average and the second predetermined value.

18. The control method of the air conditioner system of claim 7, wherein, the step of determining whether the air conditioner system is in the small-load operation state comprises:

determining whether the sum of capability requirements of all of operating indoor units in the air conditioner system is less than or equal to a second value for a fourth predetermined duration; and determining that the air conditioner system is in the small-load operating state, when the sum of capability requirements of all of the operating indoor units is less than or equal to the second value for the fourth predetermined duration.

* * * * *